(12) United States Patent
Yagita

(10) Patent No.: US 8,059,289 B2
(45) Date of Patent: Nov. 15, 2011

(54) PRINTING APPARATUS, PRINTING SYSTEM AND CONTROLLING METHOD OF PRINTING APPARATUS

(75) Inventor: Takashi Yagita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1134 days.

(21) Appl. No.: 11/552,645

(22) Filed: Oct. 25, 2006

(65) Prior Publication Data
US 2007/0103710 A1 May 10, 2007

(30) Foreign Application Priority Data
Nov. 4, 2005 (JP) .................................. 2005-321395

(51) Int. Cl.
G06F 3/12 (2006.01)
(52) U.S. Cl. ...................... 358/1.15; 358/1.13; 358/1.14
(58) Field of Classification Search .................. 358/1.13, 358/1.15, 1.1
See application file for complete search history.

(56) References Cited

U.S. PATENT DOCUMENTS

| | | | | |
|---|---|---|---|---|
| 5,450,571 A | * | 9/1995 | Rosekrans et al. ............... | 703/24 |
| 6,075,615 A | * | 6/2000 | Nakamura ................... | 358/1.14 |
| 6,502,147 B2 | * | 12/2002 | Reilly ........................... | 710/104 |
| 6,552,813 B2 | * | 4/2003 | Yacoub .......................... | 358/1.1 |
| 6,609,162 B1 | * | 8/2003 | Shimizu et al. ................. | 710/15 |
| 6,909,520 B2 | * | 6/2005 | Ogino .......................... | 358/1.15 |
| 2003/0107762 A1 | * | 6/2003 | Kinoshita et al. ............ | 358/1.15 |
| 2003/0112456 A1 | * | 6/2003 | Tomita et al. ................ | 358/1.13 |
| 2004/0057073 A1 | * | 3/2004 | Egawa et al. ................. | 358/1.15 |
| 2005/0088681 A1 | * | 4/2005 | Hosoda ......................... | 358/1.14 |
| 2006/0026600 A1 | * | 2/2006 | Yoshida ........................ | 719/310 |

FOREIGN PATENT DOCUMENTS

| | | |
|---|---|---|
| JP | 2000-118095 | 4/2000 |
| JP | 2002-199312 A | 7/2002 |
| JP | 2003-256165 | 9/2003 |
| JP | 2004-110741 A | 4/2004 |
| JP | 2005-031732 A | 2/2005 |
| JP | 2005-165774 A | 6/2005 |
| JP | 2005-173639 A | 6/2005 |
| JP | 2005-242781 A | 9/2005 |

OTHER PUBLICATIONS

The above references were cited in a Oct. 18, 2010 Japanese Office Action, which is enclosed without an English Translation, that issued in Japanese Patent Application No. 2005-321395.

* cited by examiner

Primary Examiner — King Poon
Assistant Examiner — Allen H Nguyen
(74) Attorney, Agent, or Firm — Cowan, Liebowitz & Latman, P.C.

(57) ABSTRACT

A printing apparatus comprising a memory having a plurality if storage areas which stores received print data, a setting unit which sets printing functions to be used among printing functions included in the printing apparatus for each of the plurality of storage areas, a receiving unit which receives designation of a storage area among the plurality of storage areas and print data, and a printing unit which prints the received print data by the receiving unit according to the printing functions previously set to the designated storage area by the setting unit.

6 Claims, 21 Drawing Sheets

| BOX NAME | STATE | USAGE RATE | |
|---|---|---|---|
| 01 COLOR SCREEN STAPLING PRINTER | OUT OF SHEET | 3 | PRINT... |
| 02 MONOCHROME MANUAL FEEDING PRINTER | OUT OF SHEET | 0 | PRINT... |
| 03 DOUBLE-SIDE CASSETTE 2 PRINTER | OUT OF SHEET | 0 | PRINT... |
| 04 MONOCHROME DOUBLE-SIDE A4 PRINTER | OUT OF SHEET | 0 | PRINT... |
| 05 MONOCHROME A3 BIN 2 PRINTER | OUT OF SHEET | 0 | PRINT... |
| 06 COLOR DOUBLE-SIDE A3 PRINTER | OUT OF SHEET | 0 | PRINT... |
| 07 | | 15 | |
| 08 | | 22 | |
| 09 | | 0 | |

FIG. 6

| BOX NAME | | STATE | USAGE RATE | |
|---|---|---|---|---|
| 01 | COLOR SCREEN STAPLING PRINTER | OUT OF SHEET | 3 | PRINT... |
| 02 | MONOCHROME MANUAL FEEDING PRINTER | OUT OF SHEET | 0 | PRINT... |
| 03 | DOUBLE-SIDE CASSETTE 2 PRINTER | OUT OF SHEET | 0 | PRINT... |
| 04 | MONOCHROME DOUBLE-SIDE A4 PRINTER | OUT OF SHEET | 0 | PRINT... |
| 05 | MONOCHROME A3 BIN 2 PRINTER | OUT OF SHEET | 0 | PRINT... |
| 06 | COLOR DOUBLE-SIDE A3 PRINTER | | 0 | |
| 07 | | | 15 | |
| 08 | | | 22 | |
| 09 | | | 0 | |

FIG. 7

| BOX NAME | | STATE | USAGE RATE |
|---|---|---|---|
| 01 | COLOR SCREEN STAPLING PRINTER | OUT OF SHEET | 0 |
| 02 | MONOCHROME MANUAL FEEDING PRINTER | NORMAL | 0 |
| 03 | DOUBLE-SIDE CASSETTE 2 PRINTER | NORMAL | 0 |
| 04 | MONOCHROME DOUBLE-SIDE A4 PRINTER | NORMAL | 0 |
| 05 | MONOCHROME A3 BIN 2 PRINTER | OUT OF SHEET | 0 |
| 06 | COLOR DOUBLE-SIDE A3 PRINTER | OUT OF SHEET | 15 |
| 07 | | | 0 |
| 08 | | | |
| 09 | | | |

604
[PRINT...]
[PRINT...]
[PRINT...]

FIG. 8

| BOX NAME | | STATE | USAGE RATE | |
|---|---|---|---|---|
| 802 → | 801 01 COLOR SCREEN STAPLING PRINTER | CASSETTE 3 OUT OF SHEET | 0 | PRINT... |
| 803 → | 801 02 MONOCHROME MANUAL FEEDING PRINTER | NORMAL | 0 | PRINT... |
| | 801 03 CASSETTE 2 FEEDING PRINTER | NORMAL | 0 | PRINT... |

FIG. 13

DOCUMENT TABLE

| BOX NUMBER | FILE NAME |
|---|---|
| 01 | Print1.pdf, Print2.pdf, Print3.pdf |
| 02 | ... |
| 03 | ... |
| 04 | ... |
| ... | ... |

FIG. 17

| BOX NAME | | STATE | USAGE RATE | |
|---|---|---|---|---|
| 01 | COLOR SCREEN STAPLING PRINTER | CASSETTE 3 OUT OF SHEET | 3 | MOVE |
| 02 | MONOCHROME MANUAL FEEDING PRINTER | NORMAL | 0 | MOVE |
| 03 | CASSETTE 2 FEEDING PRINTER | NORMAL | 0 | MOVE |
| 04 | MONOCHROME DOUBLE-SIDE A4 PRINTER | NORMAL | 0 | MOVE |
| 05 | MONOCHROME A3 BIN 2 PRINTER | NORMAL | 0 | MOVE |
| 06 | COLOR DOUBLE-SIDE A3 PRINTER | NORMAL | 0 | |
| 07 | | | 15 | |
| 08 | | | 22 | |
| 09 | | | 0 | |

1701

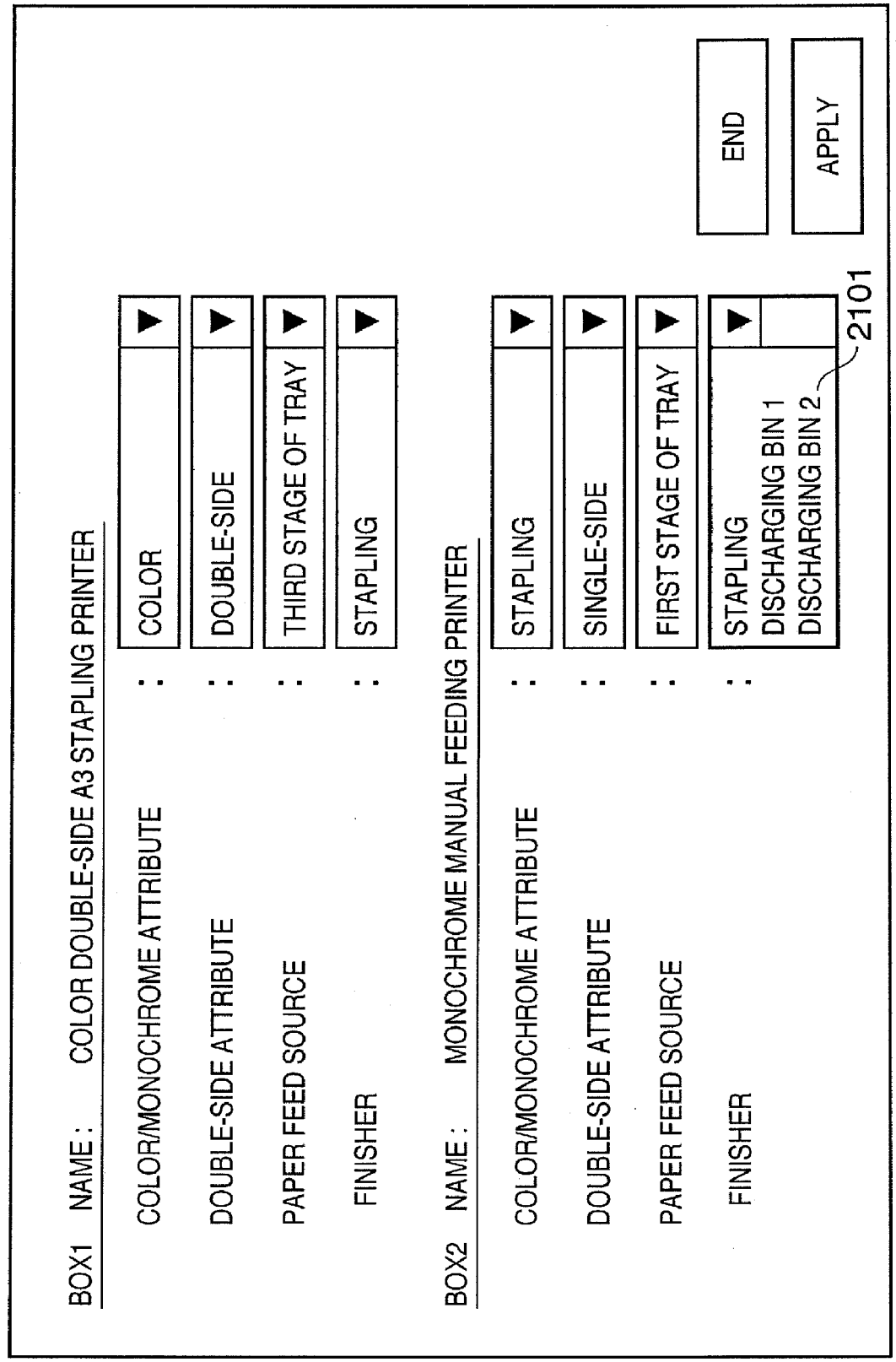

US 8,059,289 B2

PRINTING APPARATUS, PRINTING SYSTEM AND CONTROLLING METHOD OF PRINTING APPARATUS

BACKGROUND OF THE INVENTION

1. Field of the Invention

The present invention relates to a technique of providing a user interface for instructing a printing apparatus to print.

2. Description of the Related Art

Generally, a personal computer (PC) can instruct a printing apparatus on various printing conditions or printing attributes by using a printer driver installed on the PC. Contents of the instructions include, for example, the size of a sheet, the number of sheets to be outputted, color printing, double-sided printing, sheet printing and the like.

According to Japanese Patent Application Laid-Open No. 2000-118095, a technique of setting a rule for each folder whether or not to cause a printing apparatus to immediately perform printing and a rule for defining how to deal with a plurality of pages. The print data stored in the folder is immediately printed or a plurality of print pages is printed as a single job according to the rules set to the folder.

According to Japanese Patent Application Laid-Open No. 2003-256165, a technique of hierarchically organizing folders in one-to-one correspondence with printing conditions has been proposed. Specifically, according to Japanese Patent Application Laid-Open No. 2003-256165, the highest folder corresponds to the paper size and the folder at the next highest-level corresponds to the number of printed sheets. In the invention of Japanese Patent Application Laid-Open No. 2003-256165, printing conditions needed in printing can be selected one by one as folders from the highest folder to the lowest folder are selected in order. When print data is stored in the lowest folder, print processing is performed according to the selected printing conditions.

A printing apparatus with various functions has been appearing (it is also referred to as a "multi-function peripheral"). There is also a demand for such a printing apparatus that can be used from a portable terminal such as a cellular phone or a PDA (personal digital assistant).

The portable terminal does not have a printer driver. With the technique of Japanese Patent Application Laid-Open No. 2003-256165, even a portable terminal may possibly perform printing by selecting folders corresponding to printing conditions one by one. With such a technique, however, all the printing conditions (folders) need to be specified one by one every time, which is quite troublesome.

The technique of Japanese Patent Application Laid-Open No. 2000-118095 does not disclose any device relating to a user interface. Therefore, it is difficult for an operator other than an administrator to understand what kind of print processing is done for each folder.

SUMMARY OF THE INVENTION

The present invention is directed to solve at least one of these problems.

According to the first aspect of the present invention, a printing apparatus for performing print processing is provided. The printing apparatus comprising:

a presenting unit which presents a virtual printing device on a user interface, wherein the user interface is used for instructing the printing apparatus to print, and the virtual printing device is presented for each combination of one or more printing functions of the printing apparatus;

a storage unit which stores a folder provided in association with the virtual printing device; and a printing unit which prints the print data stored in the folder according to the printing function of the virtual printing device corresponding to the folder.

According to the second aspect of the present invention, a printing apparatus is provided. The printing apparatus comprising:

a memory having a plurality of storage areas which stores received print data;

a setting unit which sets printing functions to be used among printing functions included in the printing apparatus for each of the plurality of storage areas;

a receiving unit which receives designation of a storage area among the plurality of storage areas and print data; and a printing unit which prints the received print data by the receiving unit according to the printing functions previously set to the designated storage area by the setting unit.

Further features of the present invention will become apparent from the following description of exemplary embodiments (with reference to the attached drawings).

BRIEF DESCRIPTION OF THE DRAWINGS

FIG. 6 is a diagram showing an example of a user interface according to the embodiment;

FIG. 7 is a diagram showing another example of a user interface according to the embodiment;

FIG. 8 is a diagram showing still another example of a user interface according to the embodiment;

FIG. 13 is a diagram showing an example of a document table according to the embodiment;

FIG. 17 is a diagram showing an example of a UI for selecting a destination of movement according to the embodiment;

FIG. 21 is a diagram showing still another example of a box setting UI according to the embodiment.

DESCRIPTION OF THE EMBODIMENTS

Embodiments of the present invention will be shown below. Each of embodiments described below will facilitate understanding various concepts such as the highest concept, the medium concept and the lowest concept of the present invention. The technical scope of the present invention is defined by the following claims and not limited by each of the embodiments below.

Figure 1:
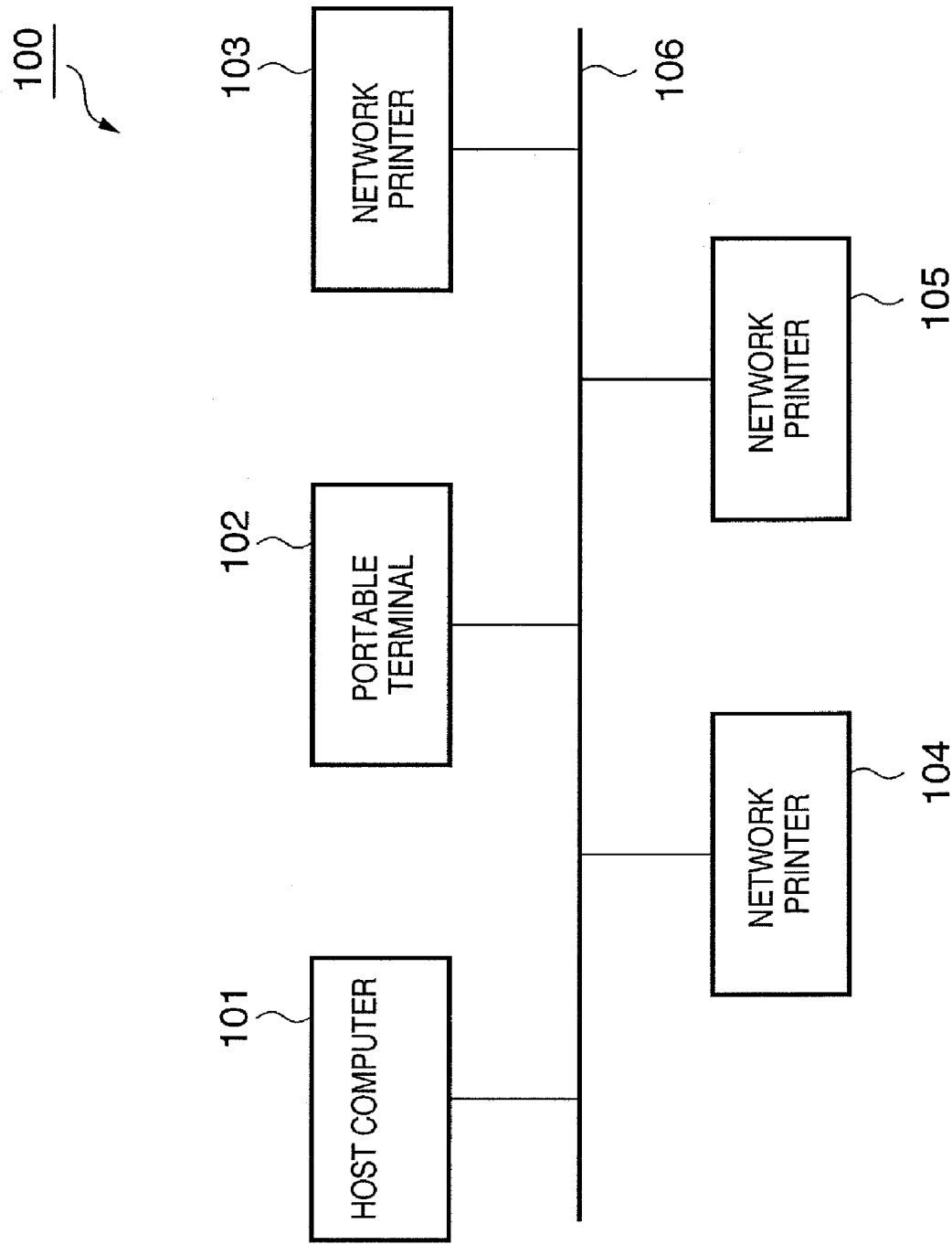
FIG. 1 is a block diagram showing the entire configuration of a printing system according to an embodiment.

<System configuration> FIG. 1 is a block diagram showing the entire configuration of a printing system 100 according to an embodiment. The printing system 100 includes a host computer 101 as an information processing apparatus, a portable terminal 102 such as a PDA or a cellular phone, and network printers 103, 104 and 105 as actual printing apparatuses. The various apparatuses are connected to each other via a network 106. Here, the host computer 101 and the portable terminal 102 are merely an example of a terminal equipment. The host computer 101 may be called as, for example, a client computer or a PC. Here, it is assumed that a so-called printer driver is not installed in the host computer 101 and the portable terminal 102.

A computer program, which realizes a user interface (UI) for instructing to print in place of a printer driver, is stored in the host computer 101 and the portable terminal 102. As such a computer program, there are a WEB browser program, a Java (registered trademark) application, plug-in software and the like. The host computer 101 and the portable terminal 102 can access network printers 103 to 105 through a WEB browser.

The storage device of the network printers 103 to 105 has a plurality of storage areas. The storage areas are displayed as a folder on a display unit of a network printer or a Web browser of a host computer 101 or a personal digital assistance and are recognized by a user. The storage area displayed as the folder represents a virtual printing device. The virtual printing device is provided for each combination of one or more printing functions included in a network printer. Accordingly, a single network printer is represented as a plurality of virtual printing devices. The folder is also called as a box. The printing function includes printing conditions, printing attributes, printing capability, a unit used for printing and the like.

The portable terminal 102 and the like can store print data (e.g., a PDF file, a document file, an image file) in a folder through a WEB browser. The portable terminal 102 and the host computer 101 may store print data in a folder using another protocol such as electronic mail.

The network printer performs printing according to a printing function of a virtual printing device corresponding to a folder storing the print data. Accordingly, an operator of the host computer 101 or the portable terminal 102 can perform print processing, which is a combination of a plurality of printing functions, by an operation easier than that in the conventional techniques.

The network printers 103 to 105 are physical printing apparatuses for receiving a printing job including print data from the host computer 101 or the portable terminal 102, analyzing the received printing job and printing it. As the network printers 103 to 105, printing apparatuses in various systems such as a laser beam printer which adopts an electronic photographing system, an inkjet printer which adopts an inkjet system, or a printer using a thermal transfer system can be adopted. That is to say, the printing apparatus according to the present invention does not depend on printing system.

Figure 2:
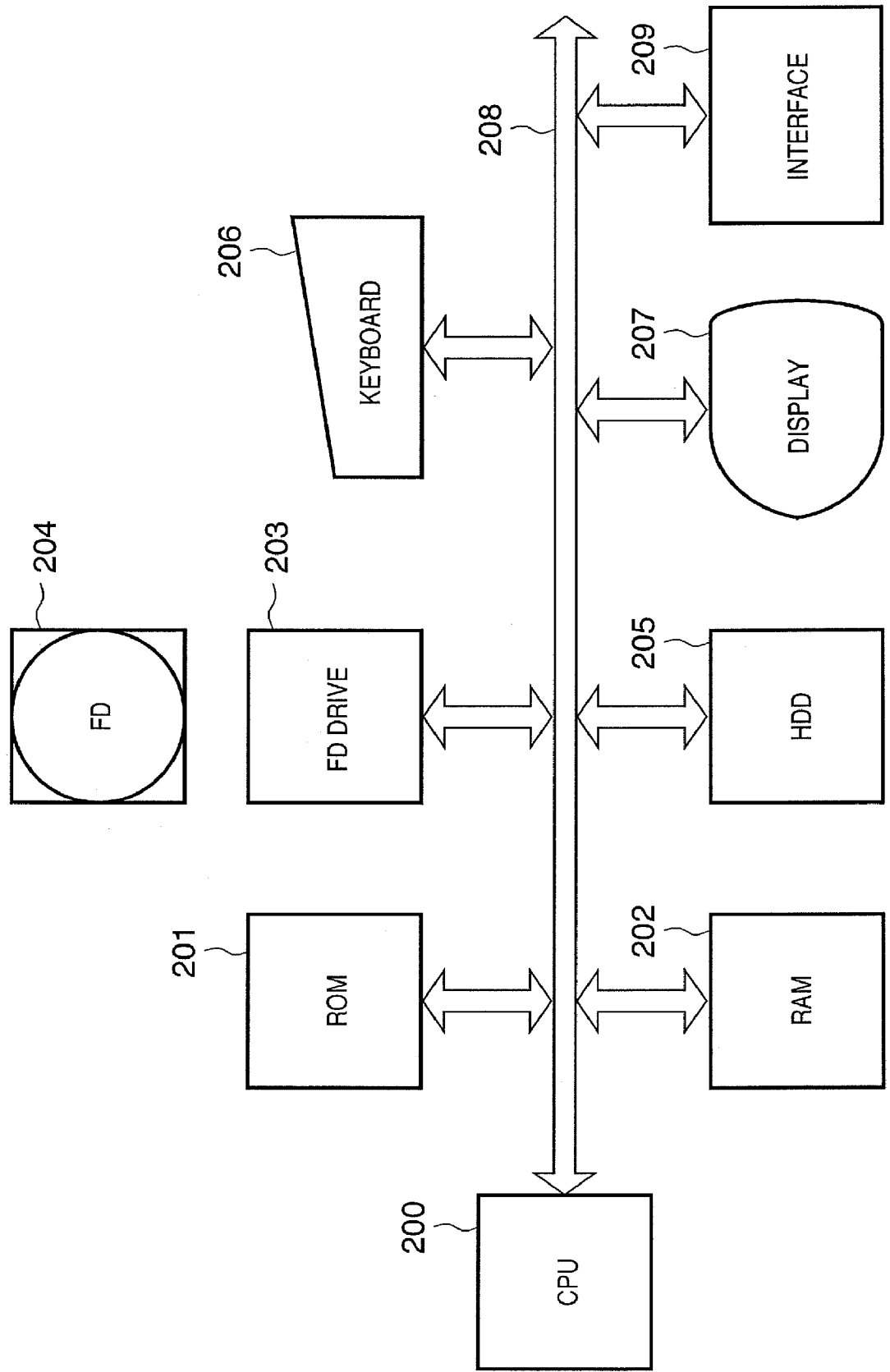
FIG. 2 is an exemplary block diagram of a terminal equipment according to the embodiment.

<Configuration of a printer and a server> FIG. 2 is an exemplary block diagram of a terminal equipment (the host computer 101 or the portable terminal 102) according to the embodiment. A CPU 200 reads out and executes a computer program stored in the HDD (hard disk drive) 205. As a computer program, there are an application program, a WEB browser program, an OS, a file system program and the like.

ROM 201 is a storage unit for storing a program such as a basic I/O program and various types of data such as font data. RAM 202 is a temporally storage unit which functions as a main memory, a working area and the like of the CPU 200. The RAM 202 stores, for example, information and files necessary for executing a computer program.

A FD (flexible disk) drive 203 is a unit for reading out a program and the like stored in the storage medium (FD 204). The host computer 101 and the portable terminal 102 may include a reading out unit for another storage medium instead of the FD drive 203 or in addition to the FD drive 203. Another storage medium includes any computer-readable storage medium, such as a CD-ROM, a CD-R, a CD-RW, a PC card, a DVD, an IC memory card or an MO.

A HDD 205 is an external storage device, which functions as a large ability memory. The HDD 205 stores various types of computer programs or data files (e.g., a PDF file) as mentioned above.

A keyboard 206 functions as an input apparatus. An operator uses the keyboard 206 to select and set a virtual printing device (folder), select a file to be printed, or input various printing instructions to the host computer 101 or the portable terminal 102. A pointing device may be used as an input apparatus in addition to the keyboard 206.

A display 207 functions as an output apparatus for outputting information on a user interface. On the user interface, for example, information on a virtual printing device (folder) is displayed.

A system bus 208 functions as a transmission medium of data in the host computer 101 or the portable terminal 102. An interface 209 functions as an input/output apparatus such as a network interface card (NIC) or a modem. Data is sent or received to or from other apparatuses on the network 106 through the interface 209.

Figure 3:
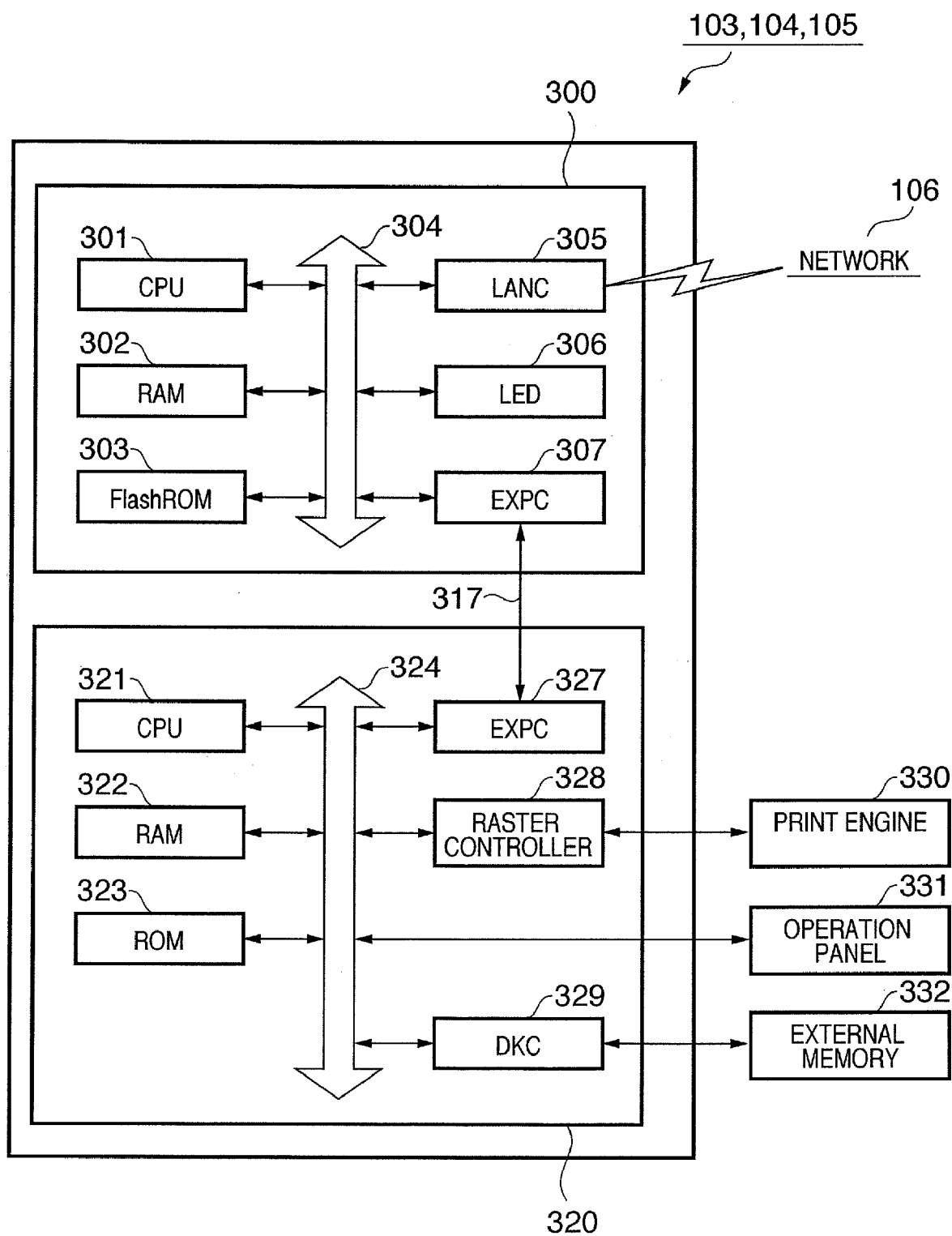
FIG. 3 is an exemplary block diagram of a network printer according to the embodiment.

FIG. 3 is an exemplary block diagram of a network printer according to the embodiment. The network printers 103, 104 and 105 are mainly divided into a print server 300 and a print controller 320.

In the print server 300, a CPU 301 executes a control program stored in a rewritable flash ROM 503. Then, the CPU 301 controls over respective units connected to a system bus 304. A RAM 302 functions as a working area of the CPU 301.

LAN controller (LANC) 305 is a controller for communicating with the host computer 101 or the portable terminal 102 connected to the network 106. The CPU 301 receives print data and a printer control command via the LAN controller 305, performs the received print command and sends out appropriate data to the print controller 320.

An LED 306 is used as a display unit for showing an operation status of the print server 300. An expansion interface 307 is an interface for connecting the print server 300 with the print controller 320.

In the print controller 320, a CPU 321 executes a control program stored in a ROM 323. The control program may be stored in an external memory 332. The external memory 332 is, for example, a hard disk drive controlled by a disk controller (DKC) 329. The ROM 323 and the external memory 332 may store resource data.

The CPU 321 controls over respective units connected to a system bus 324. A RAM 322 functions as a working area of the CPU 321. The CPU 321 processes print data received from the print server 300 via an expansion interface controller (EXPC) 327. It is assumed that the print controller 320 and the print server 300 are connected with each other via a bus 317.

The CPU 321 converts print data into raster data by a raster controller 328. The raster data or an image signal generated from the raster data are outputted to a print engine 330. The print engine performs print processing by using an electronic photographing system, an inkjet system, or a sublimation (thermal transfer) system.

An operation panel 331 functions as an input/output apparatus for inputting various instructions or outputting various kinds of information. The operation panel 331 may include, for example, a button, a touch panel, a liquid crystal panel for showing an operation state, and an LED.

Figure 4:
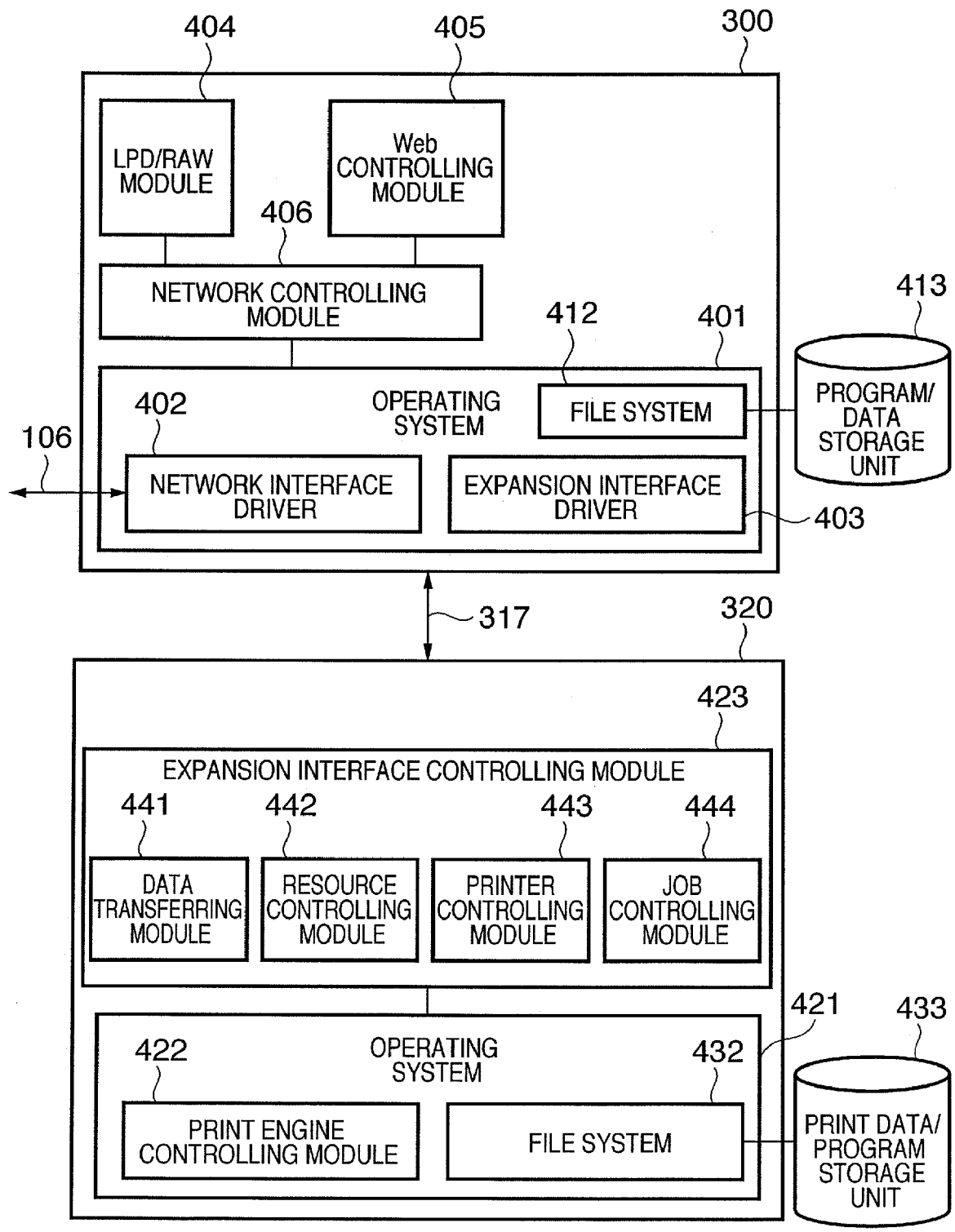
FIG. 4 is an exemplary block diagram of a control program for controlling a network printer according to the embodiment.

FIG. 4 is an exemplary block diagram of a control program for controlling a network printer according to the embodiment.

An operating system (OS) 401 controls basic input/output of data of the print server 300. The OS 401 includes a network interface driver 402, an expansion interface driver 403, and a file system 412. The network interface driver 402 is a program module for controlling the LAN controller (LANC) 305. The expansion interface driver 403 is a module for controlling an expansion interface 307. The file system 412 is a module for controlling input/output of a program/data storage unit 413. The storage unit 413 is, for example, reserved in the RAM 302.

An LPD/RAW module 404 is a module for controlling a protocol for accepting print data sent from the host computer 101 or the portable terminal 102. The LPD/RAW module 404 can pass the accepted print data to the print controller 320. The LPD/PAW module 404 may process print data in cooperation with a WEB controlling module 405.

The WEB controlling module 405 is a module, which functions as so-called WEB server or CGI (common gateway interface) program. When the WEB controlling module 405 accepts access from a WEB browser program of the host computer 101 or the portable terminal 102, it creates and sends a source file (e.g., a file by HTML) for providing a user interface. The WEB controlling module 405 obtains an operation state or a setting of the printer engine 330 from the printer controller 320. The WEB controlling module 405 accepts print data from the host computer 101 or the portable terminal 102 and stores it in a folder.

A network controlling module 406 is a module for passing data or a command between the network interface driver 402 and a WEB controlling module 405 and a LPD/RAW module 404.

On the other hand, the print controller 320 mainly includes an OS 421 and an expansion interface controlling module 423. The OS 421 is an operating system for controlling various types of processing. Inside the OS 421, a print engine controlling module 422 and a file system 432 are included. The print engine controlling module 422 controls communication between the expansion interface controlling module 423 and the print engine 330. The file system 432 controls input/output into/from a print data/program storage unit 433 storing print data or a controlling program. The print data/program storage unit 433 may store, for example, model depending resources such as a bitmap image referred from the print server 300 or an error message and the like. The storage unit 433 is reserved, for example, in the external memory 332.

The expansion interface controlling module 423 is a module for controlling the expansion interface controller 327, which communicates with the print server 300. The expansion interface controlling module 423 includes a data transferring module 441, a resource controlling module 422, a printer controlling module 44.3, and a job controlling module 444 and the like. The data transferring module 441 is a logical interface for controlling input/output of print data for each controlling type. A resource controlling module 442 is a logical interface for controlling input/output of various types of data stored in the print data/program storage unit 433. The printer controlling module 443 is a logical interface for controlling restarting of a network printer, initializing of a setting value and the like. The job controlling module 444 is a logical interface for processing an instruction of canceling or reprinting of a printing job. A command requested from the print server 300 is transferred to the OS 421 via such a logical interface. An execution result of the command is returned to the print server 300 via such a logical interface.

Figure 5:
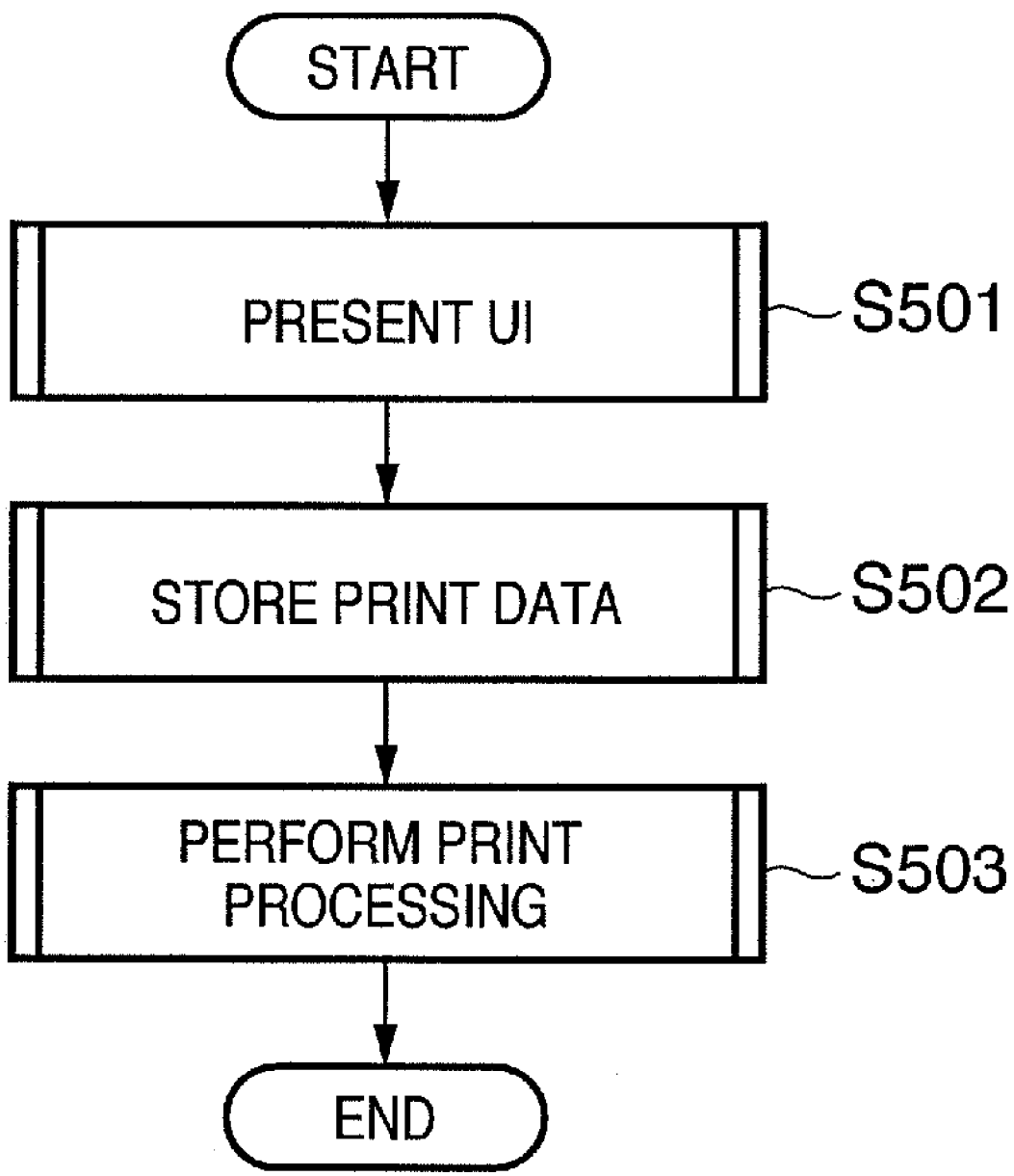
FIG. 5 is an exemplary flowchart showing print processing through a user interface according to the embodiment.

<Presenting and Printing of a user interface> FIG. 5 is an exemplary flowchart showing print processing through a user interface according to the embodiment. Particularly, the print processing also includes processing to present a UI to the host computer 101 or the portable terminal 102. It is assumed that the processing is performed in any of the network printers 103 to 105. A case where the portable terminal 102 accesses the network printer 103 will be described below. It is a matter of course that the host computer 101 may be adopted instead of the portable terminal 102.

At the step S501, when the CPU 301 of the network printer receives a request to present a user interface from the portable terminal 102, it presents the user interface to the portable terminal 102. The user interface is a user interface for instructing the network printer 103 to print from the portable terminal 102. On the user interface, a virtual printing device is displayed for each combination of one or more printing functions included in the network printer 103.

FIG. 6 is a diagram showing an example of a user interface according to the embodiment. A UI 600 is a user interface for selecting a virtual printing device. The UI is an example of being displayed on the WEB browser of the portable terminal 102. The UI is what applied a box list for checking box conditions.

Here, a virtual printing device is realized as a box for storing print data. The box is a file storage unit which is a so-called folder or directory. According to FIG. 6, each box from the box number 01 to 06 is used as a virtual printing device.

The box name 601 is identifying information used for identifying each box. If a box is used as a virtual printing device, a name which enables a combination of printing functions to be understood is preferably given to the box name 601. To the box with the box number "01", for example, the name "color double-side stapling printer" is given. That is to say, the name can tell that it is a printing device for performing color printing, double-sided printing and stapling processing.

In a state column 602, information representing an operation state of a virtual printing device is displayed. An operation state includes normal or abnormal (for example, out of sheet, consumable goods out of stock, stapler unattached). In a usage rate column 603, information on a usage rate of a virtual printing device is displayed. The usage rate includes, for example, the number of pieces of print data (jobs) stored in the folder. A print button 604 is a button for selecting (deciding) a virtual printing device which performs printing.

FIG. 7 is a diagram showing another example of a user interface according to the embodiment. This example indicates that the virtual printing devices corresponding to the box numbers from 02 to 04 are respectively in a printable (normal) state. It also indicates that the virtual printing devices of the box numbers 01, 05 and 06 are out of sheets. For the printing device which cannot perform print processing, the print button 604 is not displayed. That may contribute to facilitate an operator to avoid an error to input print data in the printing device which cannot perform printing. The print button 604 may be displayed in a form indicating that the button cannot be operated.

FIG. 8 is a diagram showing still another example of a user interface according to the embodiment. In the examples of FIG. 6 and FIG. 7, a usual box and a virtual printing device box can be distinguished as they are displayed as different icons. On the other hand, in the example of FIG. 8, printing functions of virtual printing devices are reflected on respective icons.

According to the printing device of the box number 01, for example, an image of a stapling apparatus 802 is shown in addition to an image of the body 801. That enables the operator to easily understand that it is a printing device which can perform stapling. According to the printing device of the box number 02, an image of a manual feeding unit 803 is displayed in addition to the image of the body 801. That enables the operator to easily understand that it can be manually fed.

A source file for displaying the UI 600 is created based on information obtained by the WEB controlling module 405 from the resource controlling module 442. The CPU 200 of the host computer 101 or the portable terminal 102 receives a source file of the UI 600 from the WEB controlling module 405 and displays it on the display 207.

Returning to the description of FIG. 5 and at the step S502, the CPU 301 of the network printer stores print data received from the portable terminal 102 in a folder provided in association with a virtual printing device. The folder is reserved, for example, in the external memory 332.

When the CPU 301 of the network printer detects that the print button 604 on the UI is pressed down, it sends a source file of the UI for selecting print data to the portable terminal 102.

Figure 9:
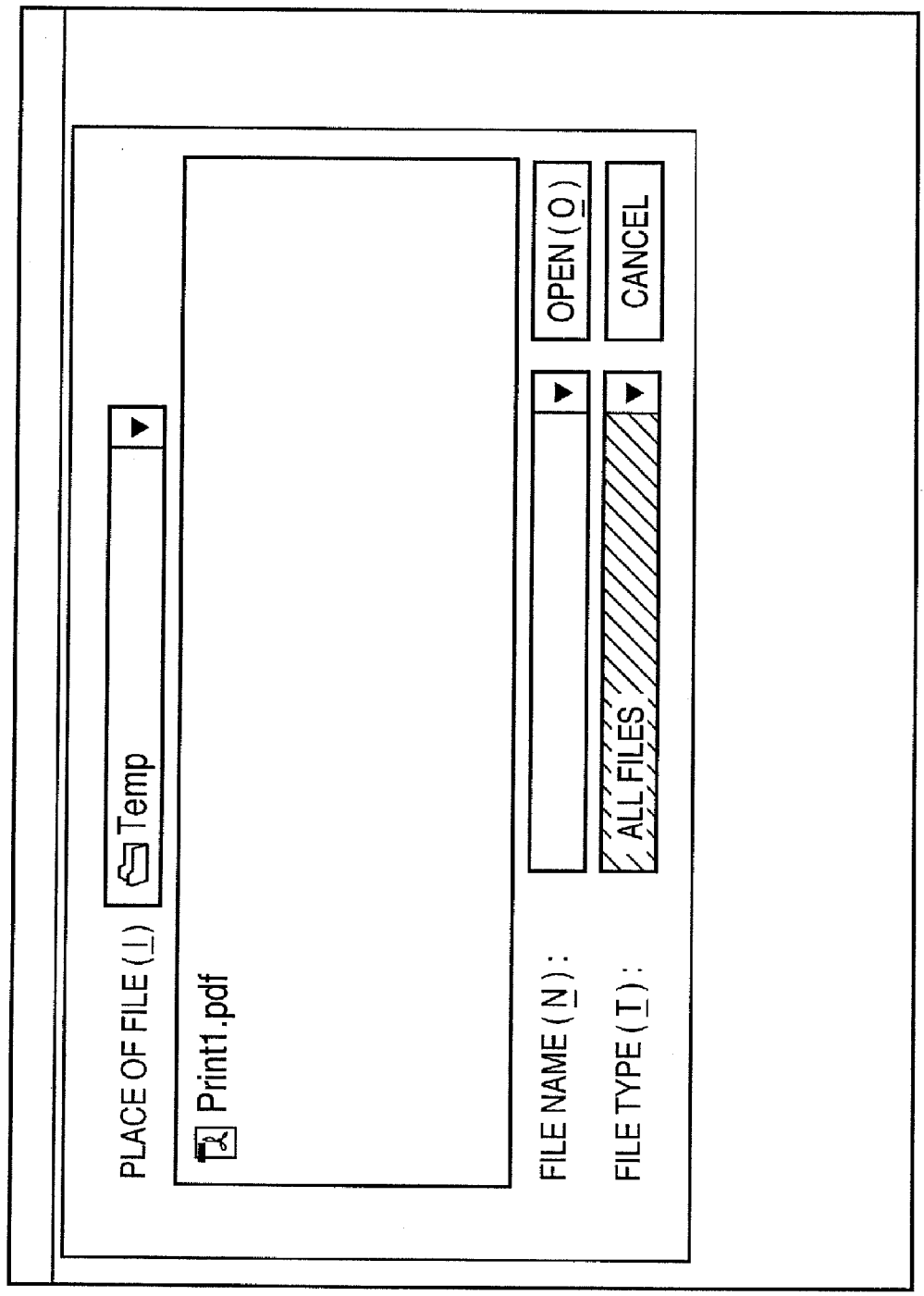
FIG. 9 is a diagram showing an example of a UI for selecting print data according to the embodiment.

FIG. 9 is a diagram showing an example of a UI for selecting print data according to the embodiment. The CPU 200 of the portable terminal 102 sends the print data selected through the UI to the network printer.

At the step S503, the CPU 301 performs print processing on the print data stored in the folder according to printing functions of the virtual printing device corresponding to the folder. The CPU 301 of the print server 300, for example, sends a printing command to the CPU 321 of the print controller 320. The CPU 321 controls the print engine 330 according to the received printing command. The CPU 321 identifies a folder storing the print data and also identifies a combination of printing functions corresponding to the folder. The CPU 321 performs print processing on the print data by applying the identified printing functions to the printer engine 330.

Figure 10:
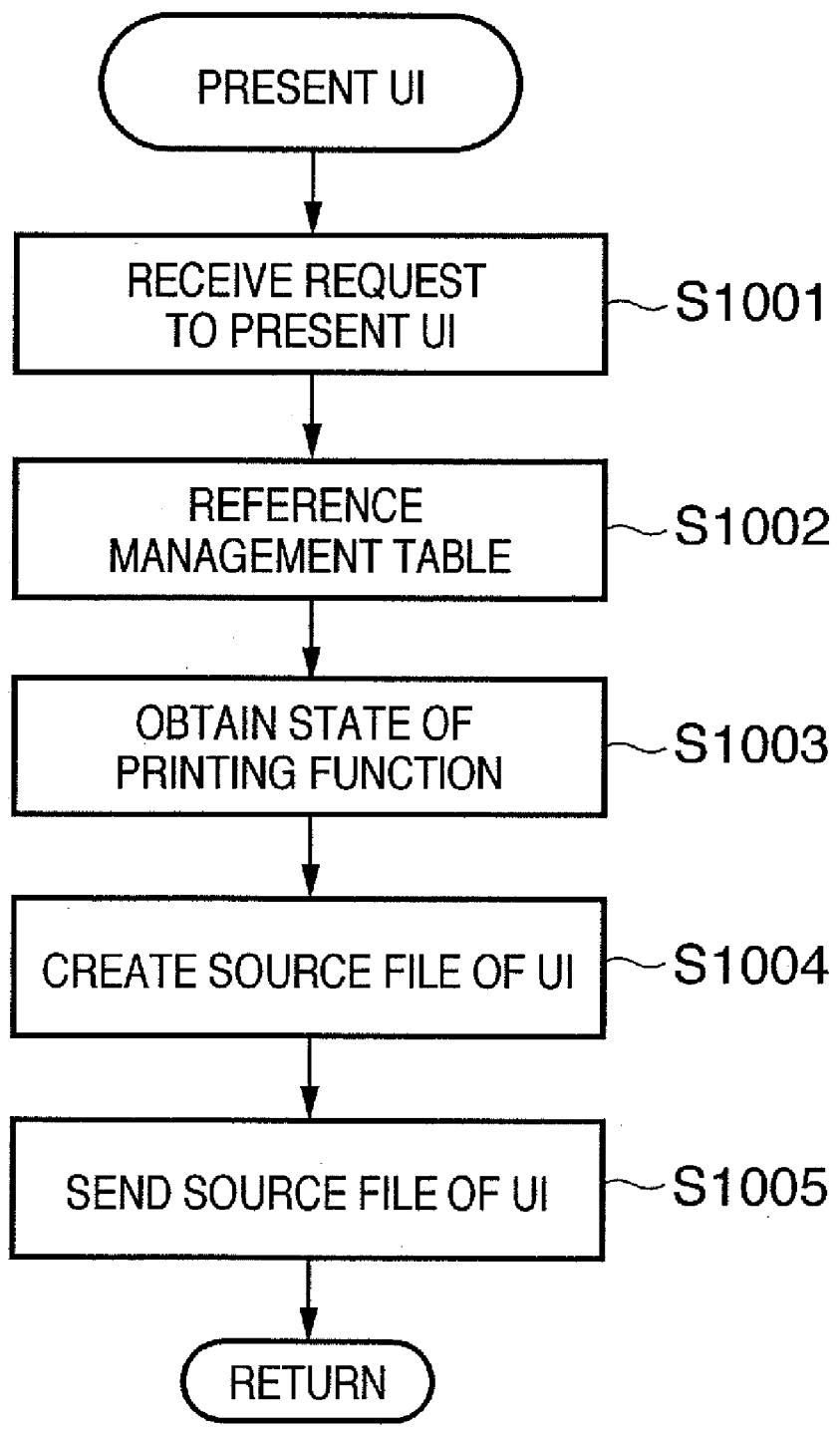
FIG. 10 is an exemplary flowchart showing a UI presenting processing according to the embodiment.

<Presenting processing of a UI> FIG. 10 is an exemplary flowchart showing a UI presenting processing according to the embodiment. The processing is what the abovementioned step S501 is made into a subroutine.

At the step S1001, the CPU 301 (WEB controlling module 405) receives a request to present the UI (for example, a request to display a box list) from the portable terminal 102. The request may be realized, for example, as an access request for a particular WEB page.

At the step S1002, the CPU 301 (WEB controlling module 405) references a box management table (hereinafter, called a management table). The CPU 301, for example, requests a management table from the CPU 321 of the print controller 320 (resource controlling module 442). The CPU 321 reads out the management table from the external memory 332 (storage unit 433) and sends it to the CPU 301.

Figure 11:
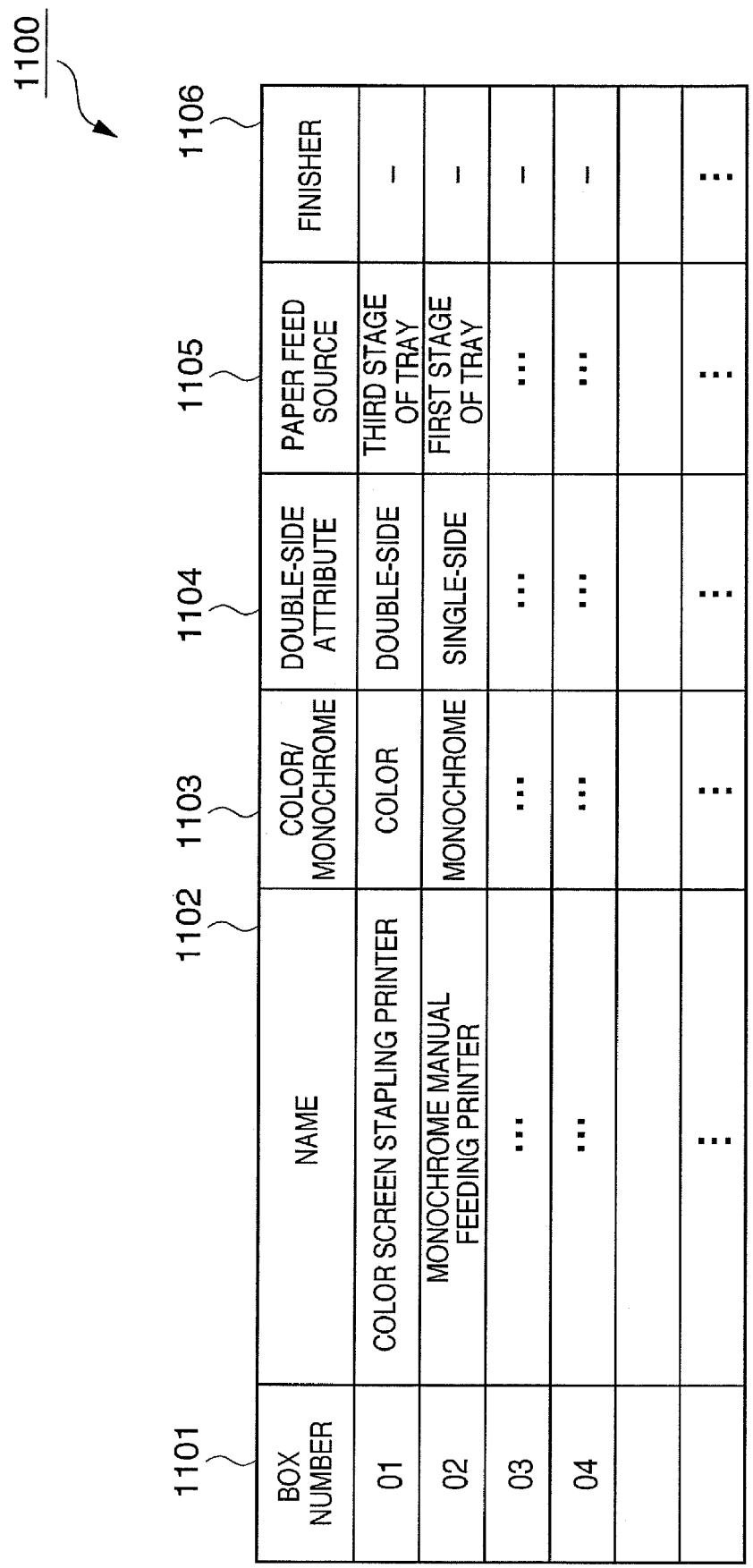
FIG. 11 is a diagram showing an example of a management table according to the embodiment.

FIG. 11 is a diagram showing an example of a management table according to the embodiment. Information on each box is registered in the management table 1100. The box number 1101 is identifying information for each box. The name 1102 is a name given to each box. In the embodiment, a name which represents a function of the printing device is desirably adopted for a box used as a virtual printing device. This is because that if an operator other than an administrator can associate the name with a combination of printing functions, the operator can easily understand what kind of printing device it is.

In the management table 1100, information on printing functions 1103-1106 used in the printing device is registered. The information on printing function 1103 indicates whether to use a color printing function or to use a monochrome printing function. The information on printing function 1104 indicates whether to use a double-sided printing function or to use a single-sided printing function. The information on printing function 1105 indicates a paper feed source (a paper feeding cassette or a paper feeding tray) to be used. The information on printing function 1106 indicates a finisher (a stapling apparatus, a punching apparatus, a sorter and the like) to be used. The information registered in the management table 1100 may be used when the user interfaces (FIG. 6 to FIG. 8) are created.

At the step S1003, the CPU 301 obtains state information representing a state of the printing functions of the print engine 330. The CPU 301 (WEB controlling module 405), for example, requests the state information from the CPU 321 (resource controlling module 442). The CPU 321 obtains the state information on the printing functions (for example, the presence of ability for color/monochrome, the presence of a double-side unit, the presence of a finisher, an attachment state of the paper feed source, and the states of them) from the print engine 330. The print engine 330 may include a sensor for detecting the presence of a double-side unit, the presence of a finisher, and an attachment state of the paper feed source. The CPU 321 sends out the obtained state information to the CPU 301.

At the step S1004, the CPU 301 creates a source file of the UI. The CPU 301 reflects, for example, information in the management table 1100 obtained from the resource controlling module 442 and state information of each printing function on the source file of the UI.

The CPU 301 can recognize that the printing device of the box number 01 uses the color printing function, the double-sided printing function and the stapling function from the management table 1100. The CPU 301 can determine whether the printing function of the printing device of the box number 01 can be actually used or not from state information of respective printing functions. If state information indicates "out of sheet", the CPU 301 creates a source file as displayed as "out of sheet" in the state column 602 of the box number 01. If all the printing functions used by the printing device of the box number 02 are normal, the CPU 301 creates a source file as displayed as "normal" in the state column 602.

At the step S1005, the CPU 301 sends the created source file of the UI to the portable terminal 102. The CPU 200 of the portable terminal 102 displays the received source file on the display 207 by the WEB browser (FIG. 6, FIG. 7, FIG. 8 and the like).

Figure 12:
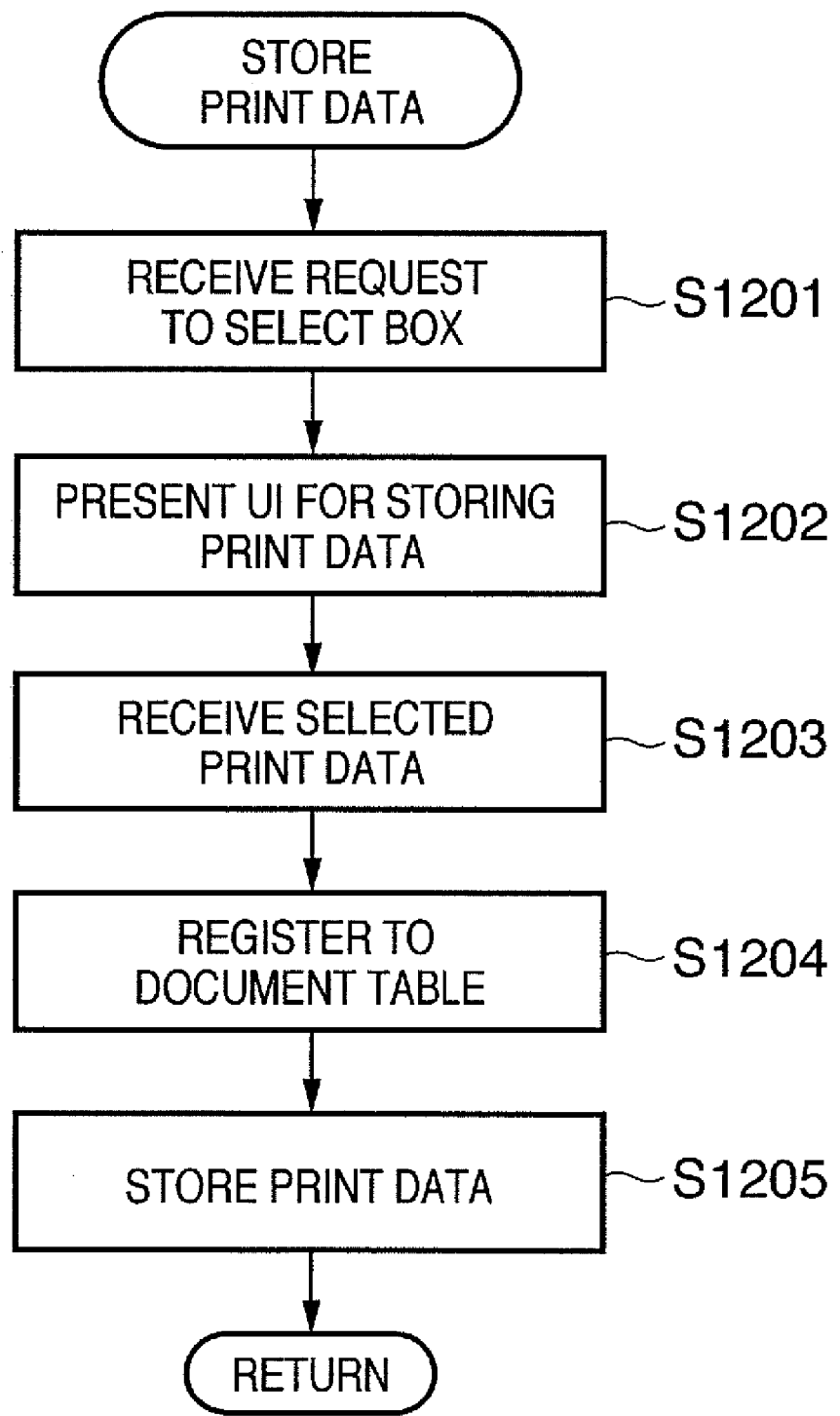
FIG. 12 is an exemplary flowchart showing storage processing of print data according to the embodiment.

<Storing processing of print data> FIG. 12 is an exemplary flowchart showing storing processing of print data according to the embodiment. The processing is what the abovementioned step S502 is made into a subroutine.

At the step S1201, the CPU 301 (WEB controlling module) of the print server 300 receives a request to select a box from the WEB browser of the portable terminal 102. When the print button 604 corresponding to any box or printing device is pressed on the UI (for example, FIG. 6 to FIG. 8) displayed on the WEB browser of the portable terminal 102, the CPU 200 of the portable terminal 102 sends a selection request. The request to select a box means the same as a request to select a virtual printing device. As such, an operator can select a box (a virtual printing device) according to the purpose of printing.

At the step S1202, the CPU 301 (WEB controlling module 405) sends a source file of a UI (for example, FIG. 9) for selecting print data to the portable terminal 102. The CPU 200 (WEB browser) of the portable terminal 102 displays a UI for selecting print data on the display 207 based on the received source file. When print data is selected on the UI, the CPU 200 (WEB browser) sends the print data to the print server 300.

At the step S1203, the CPU 301 (WEB controlling module 405) receives the print data from the portable terminal 102.

At the step S1204, the CPU 301 (WEB controlling module 405) registers the received print data in a document table in association with the selected box number.

FIG. 13 is a diagram showing an example of a document table according to the embodiment. As it is apparent from the diagram, the received print data is associated with the selected box number. A plurality of pieces of print data may be associated with a single box number. As for print data, a file name including an absolute path name or a relative path name may be stored in the document table.

At the step S1205, the CPU 301 (WEB controlling module 405) stores the received print data in the print data/program storage unit 433. It is assumed that a storage area corresponding to each folder is previously provided for the print data/program storage unit 433.

Figure 14:
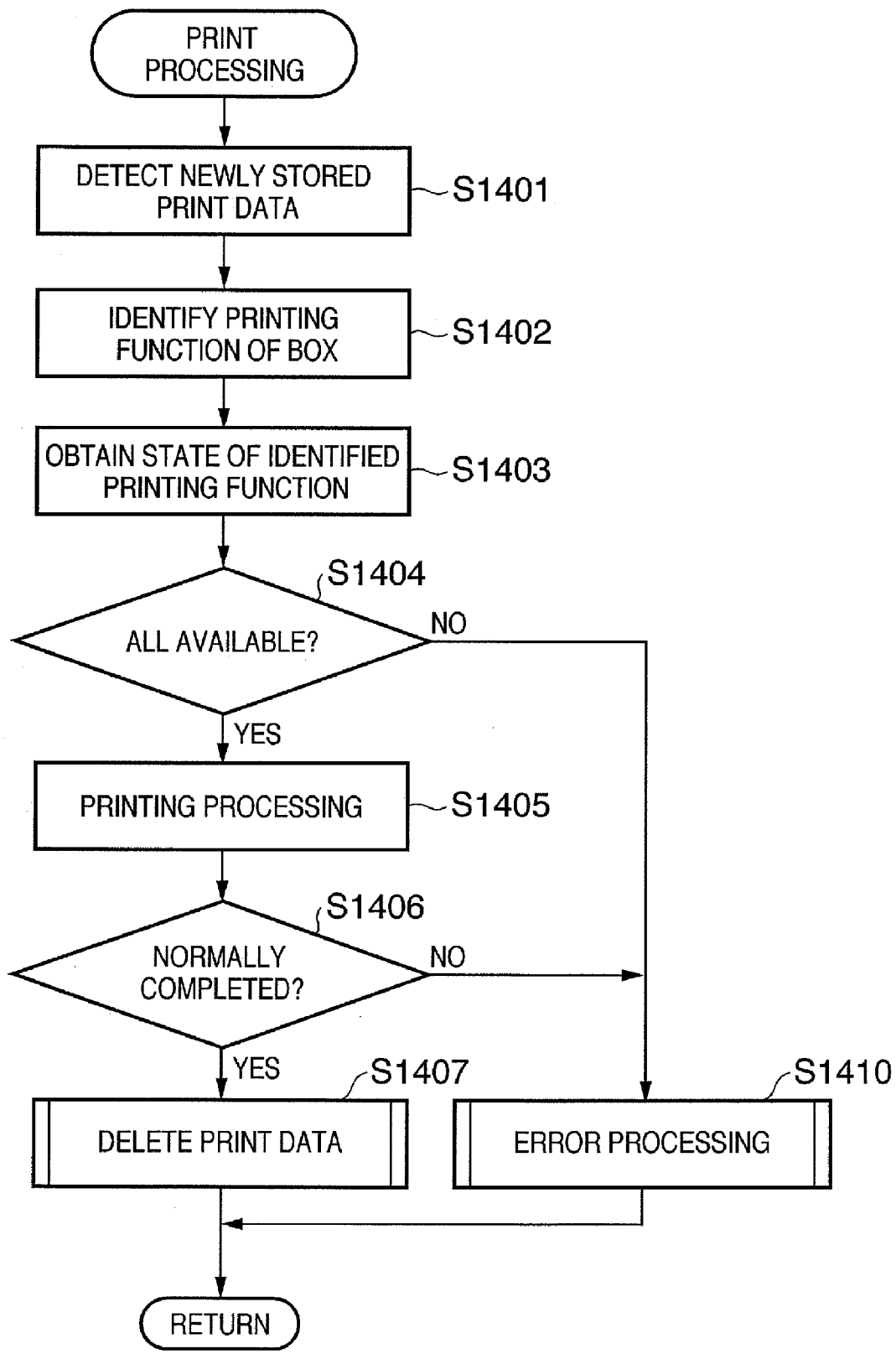
FIG. 14 is an exemplary flowchart showing print processing according to the embodiment.

<Print processing> FIG. 14 is an exemplary flowchart showing print processing according to the embodiment. The processing is what the abovementioned step S503 is made into a subroutine.

At the step S1401, the CPU 321 (resource controlling module 442) detects print data registered in the box. The CPU 321, for example, determines whether print data is registered in the box or not by referencing the document table. If there is a box registering print data, the operation proceeds to the step S1402. If there is not a box registering print data, the CPU 321 ends the print processing. As the document table is referenced, the box number registering print data and the print data name are identified.

At the step S1402, the CPU 321 identifies a printing function given to the box registering the print data. The CPU 321 identifies the printing function corresponding to the box number by referencing the box management table (for example, FIG. 11).

At the step S1403, the CPU 321 obtains an operation state of the identified printing function. The CPU 321 inquires the print engine 330 about a state of each printing function.

At the step S1404, the CPU 321 determines whether each printing function is available or not based on operation states of all the identified printing functions. If no A3 paper is in the A3 cassette, which is the identified printing function, it is determined that the box (virtual printing device) using the A3 cassette is unavailable.

If all the identified printing functions are available, the operation proceeds to the step S1405, and the CPU 321 performs the print processing by using all the identified printing functions. If print data "Print1.pdf" is stored in the box of the box number 01, the raster controller 328 converts the Print1.pdf into raster data. As the box number is 01, the CPU 321 instructs the printer engine 330 to perform color double-sided printing and stapling processing. The resource controlling module 442 passes print data to the print engine controlling module 422 on software. The print engine controlling module 422 performs the print processing with the identified printing function by controlling necessary hardware.

At the step S1406, the CPU 321 determines whether a signal representing normal completion is received from the print engine 330 or not. If printing has not normally completed due to occurrence of an error during the printing, the operation proceeds to the step S1410. If it has completed normally, the operation proceeds to the step S1407.

At the step S1407, the CPU 321 (resource controlling module 442) deletes the print data which has been printed from the box. The CPU 321 deletes information on the print data which has been printed also from the document table. Accordingly, only the print data which has not been printed is saved in the box.

On the other hand, if any of the identified printing functions is unavailable, the operation proceeds to the step S1410, and the CPU 321 performs error processing. The CPU 321 may forbid the print processing and also send a message indicating that printing can not be performed to the portable terminal 102 through the CPU 301. In such a case, the print data is saved in the box as it is. The CPU 321 may move the print data to another box which can be printed. If the printing has not completed normally (S1406), the CPU 321 performs error processing at the step S1410. The CPU 321 stops the printing and also sends a message indicating that the printing failed to the portable terminal 102 through the CPU 301. In such a case, the print data is saved in the box as it is. The CPU 321 may move the print data to another box which can be printed.

Figure 15:
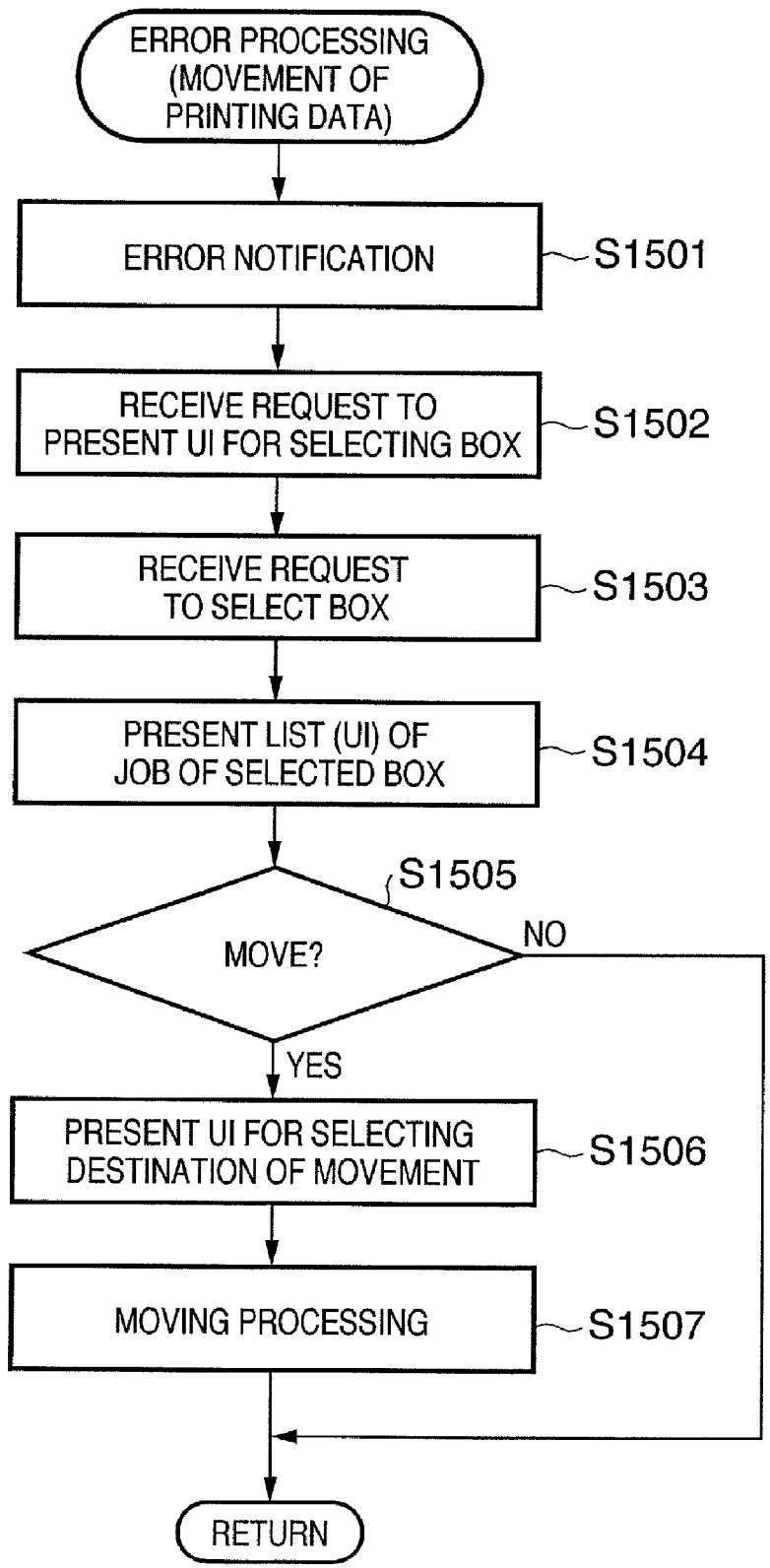
FIG. 15 is a flowchart showing an example of error processing according to the embodiment.

<Error processing (moving processing)> FIG. 15 is a flowchart showing an example of error processing according to the embodiment. The processing is what the abovementioned step S1401 is made into a subroutine. With the processing, the print data (job), which cannot be printed due to an error, can be moved to another box. Accordingly, the print data can be printed according to the printing functions of another box.

At the step S1501, the CPU 321 requests the CPU 301 to send an error notification identifying the print data which has not been printed. The CPU 301 identifies the user or the portable terminal 102 which sent the print data and sends the error notification to it. When the CPU 200 of the portable terminal 102 receives the error notification, it sends a request to present a UT by the WEB browser from the print server 300.

At the step S1502, the CPU 301 of the print server 300 receives a request to present a UI for selecting a box from the portable terminal 102. The CPU 301 creates a source file of the UI for selecting a box, and sends it to the portable terminal 102. An example of the UT is such as described from FIG. 6 to FIG. 8. The CPU 200 of the portable terminal 102 displays the received source file by the WEB browser. Here, when the CPU 200 detects that any of the boxes is selected, it sends a request to select the box to the print server 300. The request to select the box is a request to display a list of print data (job) stored in the box.

At the step S1503, the CPU 301 receives the request to select the box. The CPU 301 further creates a source file of the UI for displaying the print data list relating to the selected box. The CPU 301 searches for a document table and obtains the name of the print data and the like based on the number of the selected box.

At the step S1504, the CPU 301 presents the UI for displaying a print data list relating to the selected box on the portable terminal 102. The CPU 301, for example, sends a source file of the list (UI) to the portable terminal 102.

Figure 16:
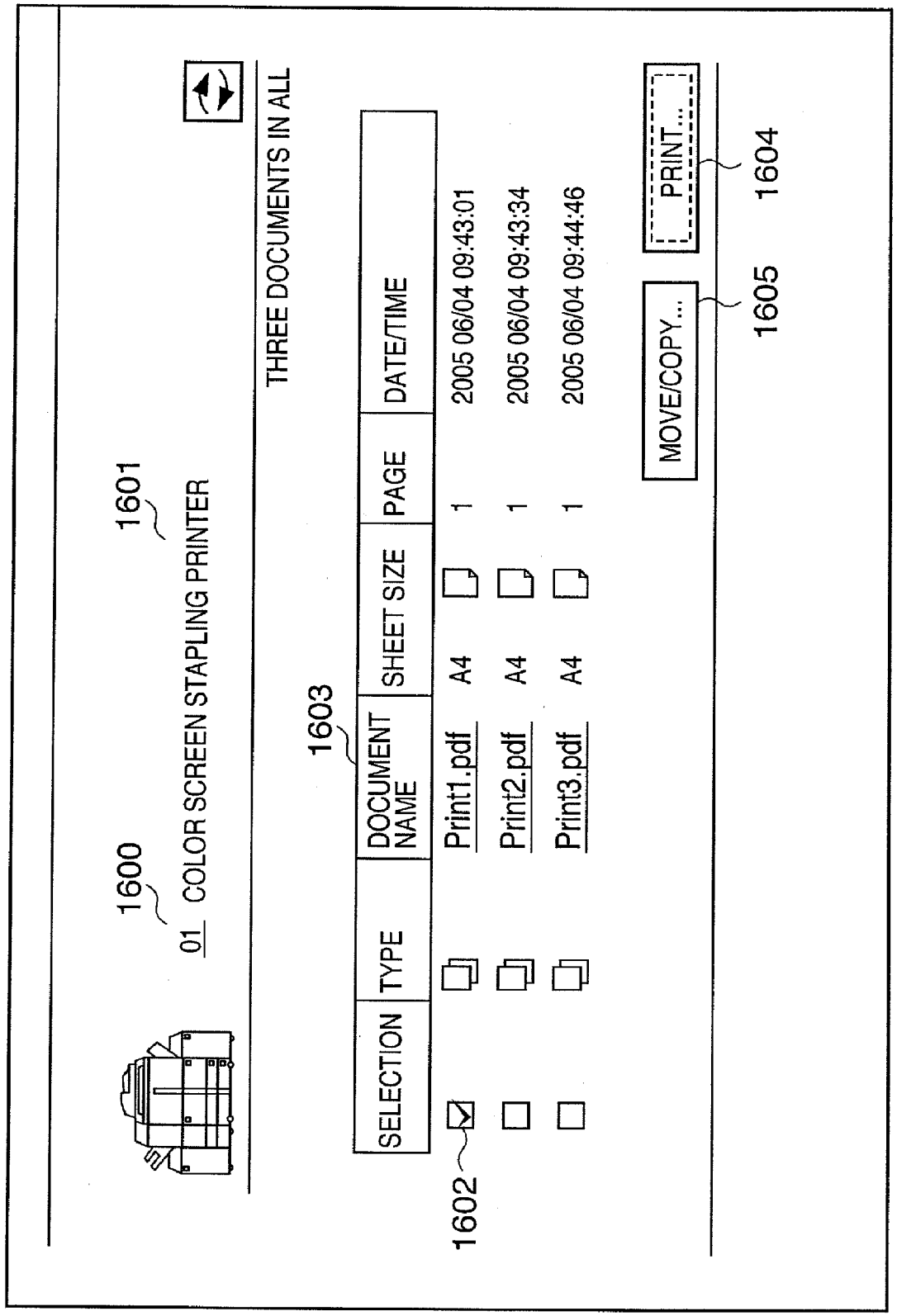
FIG. 16 is a diagram showing an example of a print data list (UI) according to the embodiment.

FIG. 16 is a diagram showing an example of a print data list (UI) according to the embodiment. A box number 1600 and a box name 1601 are included there to enable an operator to recognize the selected box. A check box 1602 is also provided there for selecting the print data stored in the box. The name of the print data 1603 is also displayed in association with the check box 1602. A print button 1604 is a button for reprinting the print data with the check box 1602 checked. A move/copy button 1605 is a button for moving the selected print data to another box. When the CPU 200 detects that the move/copy button 1605 is pressed, it sends a request to move/copy the selected print data to the print server 300.

At the step S1505, the CPU 301 determines whether a request to move was received from the portable terminal 102 or not. If the request to move was received, the operation proceeds to the step S1506. If the request to move was not received, the processing ends, while the print data is saved in the folder. In such a case, the CPU 321 of the print controller 320 will perform reprinting after a predetermined time.

At the step S1506, the CPU 301 presents a UI for selecting the destination of the movement to the portable terminal 102. For example, the CPU 301 creates the source file of the UI and sends it to the portable terminal 102. The CPU 301 (WEB controlling module 405) may inquire the CPU 321 (resource controlling module 442) about information necessary to present the UI. The CPU 200 of the portable terminal 102 realizes the UI by displaying the received source file with the WEB browser.

FIG. 17 is a diagram showing an example of a UI for selecting a destination of movement according to the embodiment. When the movement decision button 1701 is pressed, the CPU 200 of the portable terminal 102 sends information indicating the decided destination of movement to the print server 300. According to the UI in FIG. 17, it is preferable to prevent selecting a box that is not suitable for the destination of movement when displaying a list of boxes that are candidates for the destination of movement. For example, the movement decision button 1701 may be grayed out or hidden (not displayed) on the UI of FIG. 17. When an error has occurred during the print processing, the raster controller 328 may have already converted print data involved in the error to raster data (image data). For instance, if a box that is set for A3 size printing is designated as the destination of moving A4 size raster data, the A4 size raster data must be magnified to A3 size raster data. In this case, disadvantages such as deterioration of image quality are induced by the magnification, thus a box that is set for A4 size printing is desirable for the destination of movement. Namely, a box suitable for the destination is changed depending upon a format of a print data at the time of aborting the print processing, i.e. depending upon whether a raster data has been made or not. Therefore, in this embodiment, the format of a print data is determined when aborting a print processing due to an error. In this result, if the print data has not been converted to a raster data yet, the UI is displayed such that all boxes can be selected as candidates for the destination of movement. On the other hand, if the print data has already been converted to the raster data, the UI is displayed such that only boxes that are set for corresponding paper size and/or print layout can be selected as candidates for the destination of movement. Shortly, a selectable box as a candidate for a destination of movement is switched according to the determination result of the format of print data at the time of aborting the print processing.

At the step S1507, when the CPU 301 receives information on the decided destination of movement, it moves the print data to be moved to a box selected as a destination of movement. In such a case, it is a matter of course that the document table is also updated by the CPU 321. If it is the copy and not the movement that is selected, the print data is written into another box and also saved in the original folder.

<Setting processing of a folder> The abovementioned setting processing of a folder will be described below. Here, the setting processing through the portable terminal 102 will be described for convenience. The setting processing, however, may be performed through the operation panel 331 of the network printer. The setting processing may also be performed through the host computer 101.

Figure 18:
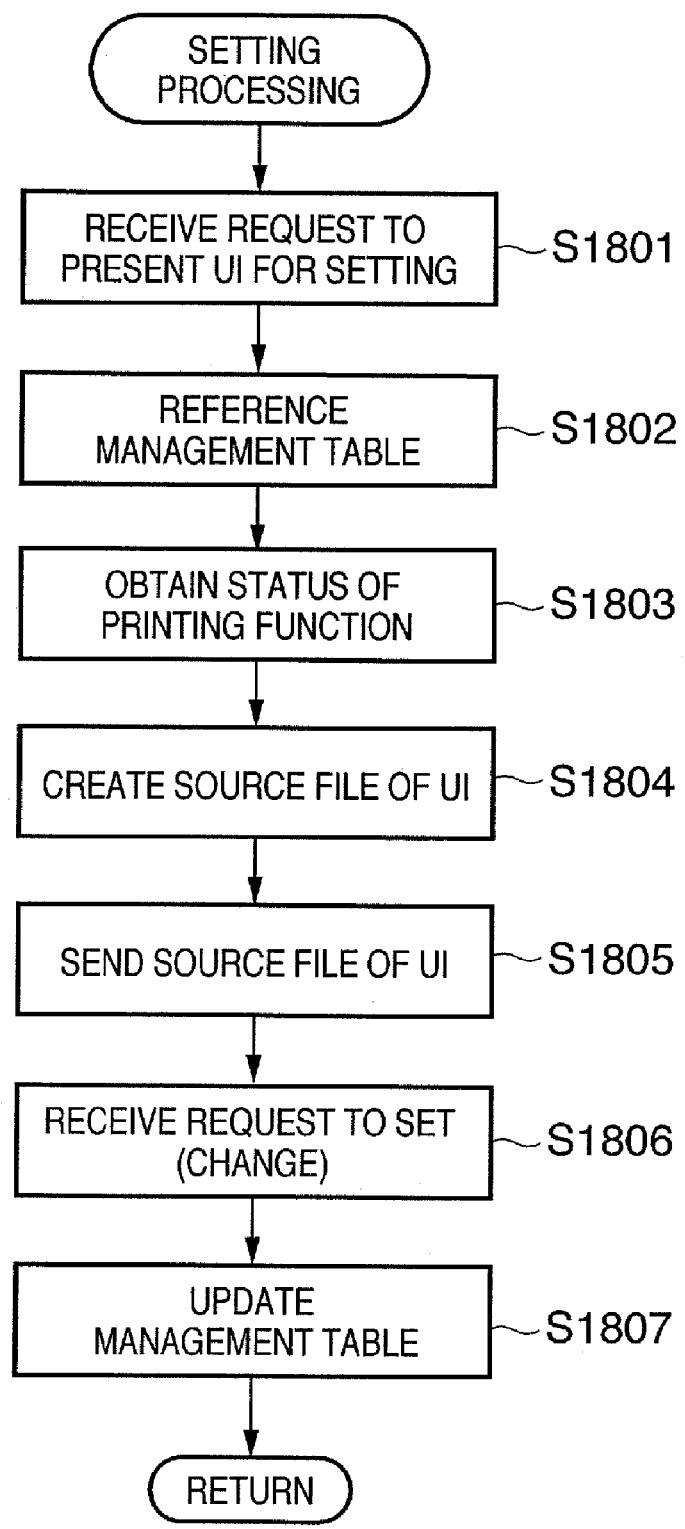
FIG. 18 is an exemplary flowchart showing setting (changing) processing of a box according to the embodiment.

FIG. 18 is an exemplary flowchart showing setting (changing) processing of a box according to the embodiment. At the step S1801, the CPU 301 (WEB controlling module 405) receives a request to present the UI (for example, a request to set a box) from the portable terminal 102. That request may be realized, for example, as a request to access a particular WEB page.

At the step S1802, the CPU 301 (WEB controlling module 405) references the management table (for example, FIG. 11). The CPU 301, for example, requests a management table from the CPU 321 (resource controlling module 442) of the print controller 320. The CPU 321 reads out the management table from the external memory 332 (storage unit 433) and sends it to the CPU 301.

At the step S1803, the CPU 301 obtains state information indicating a state of printing functions of the print engine 330 (WEB controlling module 405) from the CPU 321 (resource controlling module 442). That is to say, the CPU 321 (resource controlling module 442) is assumed to monitor the printing functions provided for the network printer. That enables addition or deletion of the printing function to be detected.

At the step S1804, the CPU 301 creates a source file of the UI. The CPU 301, for example, reflects information in the management table 1100 or state information on each printing function obtained from the resource controlling module 442 on the source file of the UI. The source file is created, for example, so that a printing function unavailable due to an error or an unattached printing function is displayed on the UI in such a state as it cannot be selected by an operator. Contents of a virtual printing device and a folder will be updated in this manner. On the other hand, if a plurality of options for printing functions are present, any option may be adapted to be selected by a pull-down menu.

At the step S1805, the CPU 301 sends the created source file of the UI to the portable terminal 102. The CPU 200 of the portable terminal 102 displays the received source file on the display 207 by the WEB browser.

Figure 19:
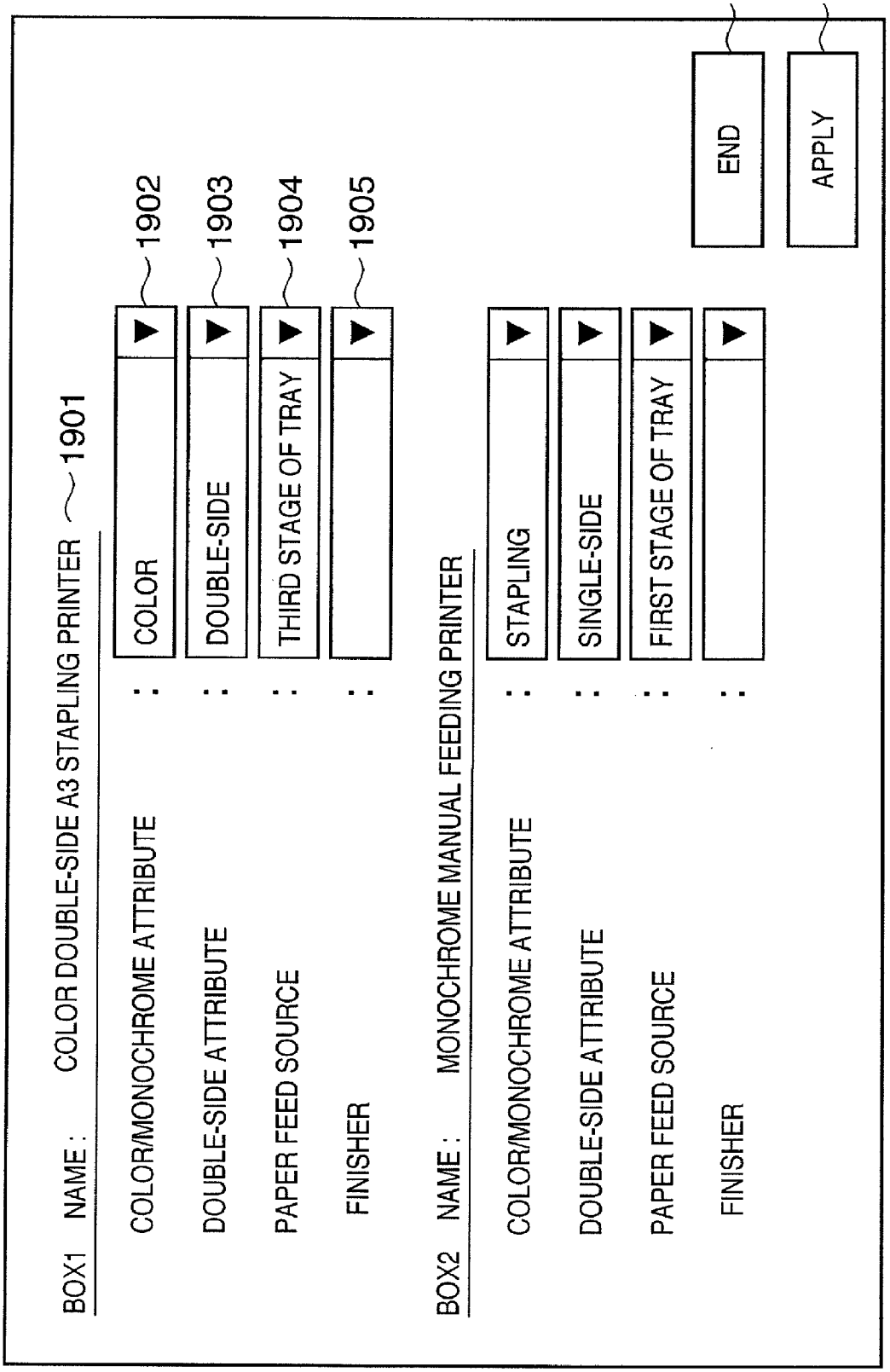
FIG. 19 is a diagram showing an example of a box setting UI according to the embodiment.

FIG. 19 is a diagram showing an example of a box setting UI according to the embodiment. A box number and a box name 1901 read out from the management table are displayed for each box so that each box can be distinguished from each other. In this example, the attribute of color/monochrome, the attribute of double-side/single-side, the attribute of paper feed source, and the attribute of a finisher are exemplified as settable printing functions. Each attribute is alternatively selected by the pull-down menus from 1902 to 1905.

When the end button 1906 is pressed down, an end instruction is sent from the portable terminal 102 to the print server 300. When the application button 1907 is pressed down, a request to apply updated contents is sent from the portable terminal 102 to the print server 300 with information for identifying each updated attribute.

Figure 20:
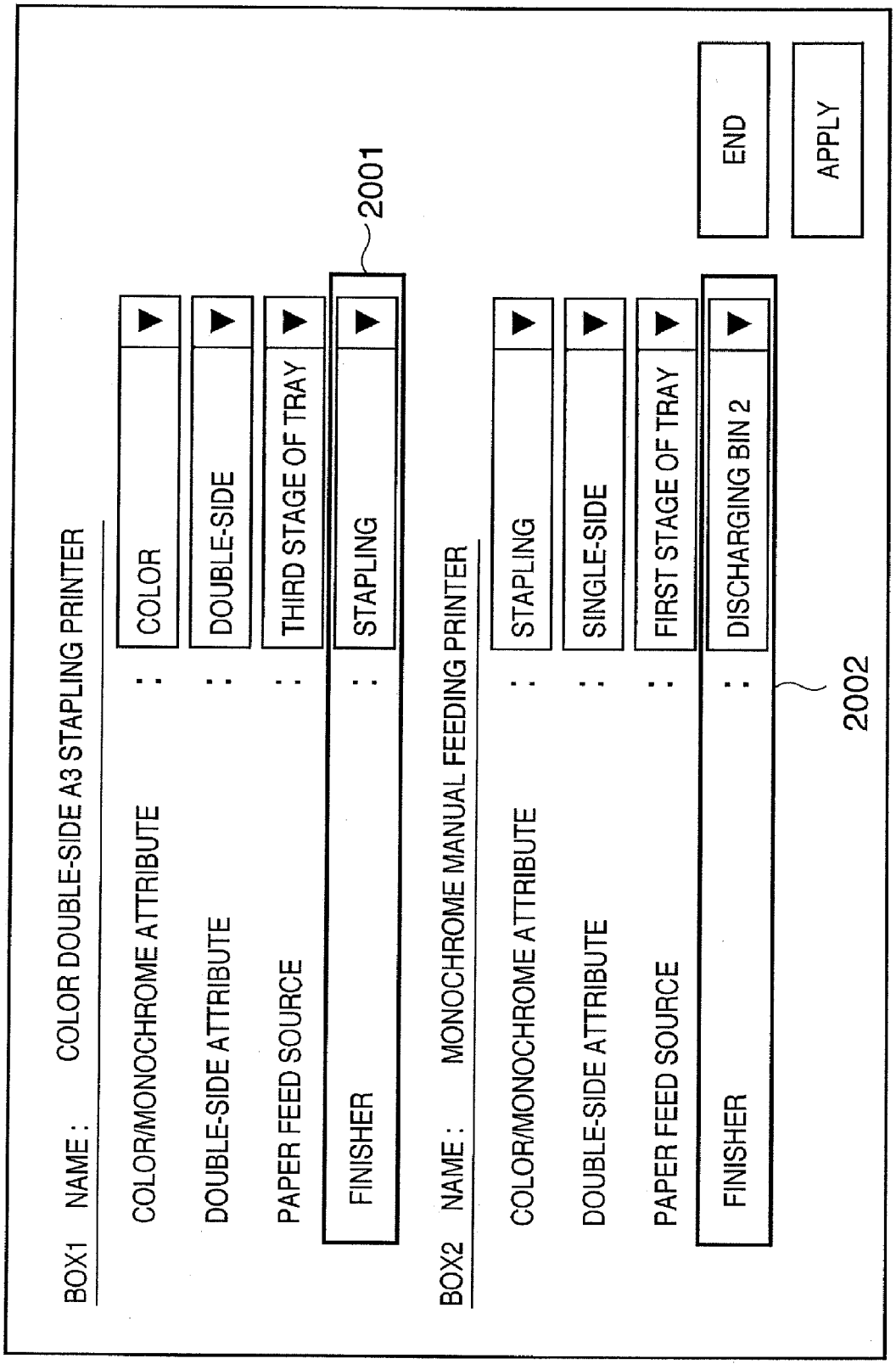
FIG. 20 is a diagram showing another example of a box setting UI according to the embodiment.

FIG. 20 is a diagram showing another example of a box setting UI according to the embodiment. Particularly in this example, a UI in the case where a printing function in an unavailable sate is present is shown. According to the box1, a stapling function is grayed out (2001). According to the box2, a paper discharging bin 2 is grayed out (2002). That can let an operator of the portable terminal 102 to recognize that the stapling function and the paper discharging bin 2 cannot be used respectively.

FIG. 21 is a diagram showing still another example of a box setting UI according to the embodiment. Particularly in this example, a function of a finisher for the box2 can be selected by the pull-down menu 2101. Note that not only setting items for printing but also setting items for other functions may be displayed on the box setting UIs shown in FIGS. 19 to FIG. 21. In the example of FIG. 14, print data is deleted from the box after the print process has finished according to the print function of the box. However, a specified box may continue to store print data after the print processing has finished. In this case, the specified box is applied to a data storing setting in advance by pressing down a storing button (not shown) on the UIs in FIGS. 19 to 21. Thus, a user can repeatedly print the print data stored in the specified box.

At the step S1806, the CPU 301 receives a request to change a setting of a folder from the portable terminal 102. At the step S1807, the CPU 301 updates the management table by reflecting the contents updated by the portable terminal 102 through the UI on the management table.

Operations and advantages of the embodiment mentioned above will be summed up. A printing apparatus presents a virtual printing device to a terminal equipment for each combination of one or more printing functions included by the printing apparatus in the user interface for instructing the printing apparatus (for example, network printers 103 to 105) to print. The printing apparatus stores a folder provided in association with a virtual printing device to the storage unit (for example, the external memory 332). Further, the printing apparatus prints the print data stored in the folder according to the printing functions of the virtual printing device corresponding to the folder. Therefore, even an operator other than an administrator can perform a printing function which is a combination of a plurality of printing functions in a relatively simple operation.

According to the embodiment, the printing apparatus may present a virtual printing device on a user interface as a folder. That facilitates the present invention to be applied to an existing printing apparatus with a folder function.

According to the embodiment, the printing apparatus presents a name of a virtual printing device or a folder based on the name of a printing function relating to a virtual printing device (for example, FIG. 6 to FIG. 8). That facilitates the operator to easily determine which folder (virtual printing device) is a combination of what kind of printing functions.

According to the embodiment, the CPU 301 obtains an operation state for each virtual printing device. The CPU 301 further presents information on an operation state for each virtual printing device on the user interface. That allows the operator to visually recognize a state of any virtual printing device through the UI.

Whether the printing function of a virtual printing device can be used or not may be presented on the UI as an operation state. As an operation state of a virtual printing device is also presented on the user interface, the operator can recognize the virtual printing device which can immediately perform printing at first sight. That may also reduce errors by an operator to input print data into an unavailable virtual printing device.

If a virtual printing device cannot perform printing, the CPU 301 or the CPU 321 preferably forbids printing by the virtual printing device. After print data is stored in a folder, for example, an error may occur to the printing function of the folder. In such a case, a jam can be effectively reduced as printing is controlled to be forbid.

According to the embodiment, the CPU 321 desirably deletes normally printed print data from a folder, while saving print data which has not been normally printed in a folder. By deleting the normally printed print data from a folder, the CPU 321 can effectively use the external memory 332. If unprinted print data is always deleted, it requires an operator to store the print data again and it is inconvenient for the operator. Accordingly, print data which has not been normally printed may be expected to be reprinted after a predetermined time, as it is saved in the folder. This is because that a printing function with an error may have been recovered after the predetermined time. As the error is caused by an out of sheet or the like, for example, the error may be eliminated rather easily.

According to the embodiment, the CPU 301 or the CPU 321 may cause a virtual printing device corresponding to another folder to print print data which has not been normally printed by storing the print data in the other folder. An operator may desire to immediately perform printing. The operator can immediately perform the printing by approving to move the print data between folders without needing to store the print data again.

According to the embodiment, the CPU 301 may present one or more candidates which can be selected as anther folder on a user interface (for example, FIG. 17). As various virtual printing devices (folders) with different combinations of printing functions are displayed on the UI, the operator easily selects another printing device according to the purpose.

According to the embodiment, the CPU 301 or the CPU 321 monitors printing functions provided for a printing apparatus. When a printing function is added or deleted, the CPU 301 or the CPU 321 updates contents of a virtual printing device and a folder. This can keep the contents of the virtual printing device and the folder displayed on the UI updated. This may reduce an error by an operator to input print data into an unavailable virtual printing device.

The CPU 321 desirably presents the UI on a terminal equipment by performing a WEB server program. These days, as almost all PCs or portable terminals are equipped with a WEB browser, the UI is desirably realized by a WEB based technique. In such a case, reform operations of a PC or a portable terminal may be reduced near to zero.

[Other Embodiment] As various embodiments have been detailed above, the present invention may be applied to a system including a plurality of appliances or may be applied to an apparatus including a single appliance. The network printers 103, 104 and 105 may be realized by a plurality of apparatuses of respective print servers 300 and print controllers 320. That is to say, the print server 300 presents a virtual printing device for each combination of one or more printing functions provided for the printing apparatus on the terminal equipment. A folder may be reserved on the RAM 202 of the print server 300.

Although the portable terminal 102 is used as a terminal equipment in the above embodiment, the host computer 101 without a printer driver installed may be used as a terminal equipment. In such a case, even the host computer 101 without a printer driver installed has an advantage of being able to perform print processing which is a combination of one or more printing conditions.

Although a WEB based technique is used in the above embodiment to realize the present invention, a dedicated computer program which provides the same effect as that may be used instead. As the WEB based technique is widespread in PCs or cellular phones, it is the more preferable.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-321395, filed on Nov. 4, 2005, which is hereby incorporated by reference herein in its entirety.

What is claimed is:

1. A printing apparatus comprising:
    a memory having a plurality of storage areas which store print data;
    a setting unit which sets a printing function to be used among printing functions of said printing apparatus for each of the plurality of storage areas;
    a receiving unit which receives from the information processing apparatus print data and information indicating a storage area selected by an information processing apparatus;
    a storing unit which stores print data received by said receiving unit to the selected storage area by said setting unit;
    a printing unit which prints the print data stored by storing unit according to the printing function set to the selected storage area by said setting unit;
    a generating unit which, in a case where said printing unit cannot print the print data stored by said storing unit according to the printing function set to the selected storage area by said setting unit, generates a user interface on which a user selects another storage area to which the print data is to be transferred or copied from among the plurality of storage areas; and
    a processing unit which transfers or copies the print data to the other storage area selected by the user on the user interface generated by said generating unit,
    wherein said printing unit prints the print data according to a printing function set to the other storage area by said setting unit.

2. A printing apparatus according to claim 1, further comprising:
    a display unit which lists the plurality of storage areas and the printing functions set for each of the plurality of storage areas by associating them with each other.

3. A printing apparatus according to claim 2, wherein said display unit distinguishably displays whether the printing functions set for each of the plurality of storage areas are available or not.

4. A printing apparatus according to claim 1, wherein the printing functions included in said printing apparatus are any of a color printing function, a monochrome printing function, a double-sided printing function, a single-sided printing function, and a stapling function.

5. A method for controlling a printing apparatus, comprising the steps of:
    storing print data in a plurality of storage areas in a memory;
    setting a printing function to be used among printing functions of said printing apparatus for each of the plurality of storage areas;
    receiving from the information processing apparatus print data and information indicating a storage area selected by an information processing apparatus;
    storing print data received in said receiving step to the selected storage area;
    printing the print data stored in said storing step according to the printing functions set to the selected storage area;

generating, in a case where the print data stored in said storing step cannot be printed according to the printing function set to the selected storage area in said setting step, a user interface on which a user selects another storage area to which the print data is to be transferred or copied from among the plurality of storage areas; and processing by transferring or copying the print data to the other storage area selected by the user on the generated user interface, wherein the print data is printed according to a printing function set to the other storage area in said setting step.

6. A computer program stored in a non-transitory storage medium for performing a method of controlling a printing apparatus, the method comprising the steps of:

storing print data in a plurality of storage areas in a memory;

setting a printing function to be used among printing functions of said printing apparatus for each of the plurality of storage areas;

receiving from the information processing apparatus print data and information indicating a storage area selected by an information processing apparatus;

storing print data received in the receiving step to the selected storage area;

printing the print data stored in said storing step according to the printing functions set to the selected storage area;

generating, in a case where the print data stored in said storing step cannot be printed according to the printing function set to the selected storage area, a user interface on which a user selects another storage area to which the print data is to be transferred or copied from among the plurality of storage areas; and processing by transferring or copying the print data to the other storage area selected by the user on the generated user interface, wherein the print data is printed according to a printing function set to the other storage area in said setting step.

* * * * *